US011140706B2

(12) United States Patent
Akkarakaran et al.

(10) Patent No.: US 11,140,706 B2
(45) Date of Patent: Oct. 5, 2021

(54) DATA TRANSMISSIONS DURING BASE STATION BEAMSWEEP

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US); Makesh Pravin John Wilson, San Diego, CA (US); Kaushik Chakraborty, San Diego, CA (US); Xiao feng Wang, San Diego, CA (US); Shengbo Chen, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/883,848

(22) Filed: Jan. 30, 2018

(65) Prior Publication Data
US 2018/0220448 A1 Aug. 2, 2018

Related U.S. Application Data

(60) Provisional application No. 62/453,410, filed on Feb. 1, 2017.

(51) Int. Cl.
H04W 72/14 (2009.01)
H04W 72/04 (2009.01)
(Continued)

(52) U.S. Cl.
CPC .......... H04W 72/14 (2013.01); H04L 5/0023 (2013.01); H04L 5/0044 (2013.01);
(Continued)

(58) Field of Classification Search
CPC ..... H04W 72/14; H04L 5/0023; H04L 5/0044
See application file for complete search history.

(56) References Cited

U.S. PATENT DOCUMENTS

2013/0021194 A1* 1/2013 Harman ................. G01S 13/48
342/104
2013/0058315 A1* 3/2013 Feuersanger ....... H04W 52/281
370/336
(Continued)

FOREIGN PATENT DOCUMENTS

WO WO2017183848 A1 10/2017

OTHER PUBLICATIONS

Jeong C., et al., "Random Access in Millimeter-Wave Beamforming Cellular Networks: Issues and Approaches", Millimeter-Wave Communications for 5G IEEE Communications Magazine, IEEE Service Center, Piscataway, US, vol. 53, No. 1, Jan. 1, 2015, pp. 180-185, XP011570628, ISSN: 0163-6804, DOI: 10.1109/MCOM.2015.7010532 [retrieved on Jan. 14, 2015].
(Continued)

Primary Examiner — Kevin M Cunningham
(74) Attorney, Agent, or Firm — Holland & Hart LLP

(57) ABSTRACT

A grant may allocate resources for an uplink transmission by a user equipment (UE) in a system using beamforming, where the resources may be used by the UE to transmit data or control information during a time that a base station is listening in a certain receive beam direction. A UE may be in communication with a base station using beamformed transmissions, and the base station may send a resource grant to the UE for uplink transmissions that correspond to a receive beam direction of a beamsweeping operation. The UE may then transmit data and/or uplink control information to the base station according to the resource grant and when the base station is listening in the corresponding direction. In some examples, the UE may send the uplink transmission to
(Continued)

the serving base station, and transmit a random access channel to another base station based on the beamsweeping operation.

30 Claims, 19 Drawing Sheets

(51) Int. Cl.
*H04L 5/00* (2006.01)
*H04W 74/08* (2009.01)
*H04W 16/28* (2009.01)
*H04W 88/08* (2009.01)
*H04W 88/02* (2009.01)

(52) U.S. Cl.
CPC .......... *H04L 5/0048* (2013.01); *H04L 5/0091* (2013.01); *H04W 16/28* (2013.01); *H04W 72/044* (2013.01); *H04W 72/0413* (2013.01); *H04W 74/0833* (2013.01); *H04L 5/001* (2013.01); *H04W 88/02* (2013.01); *H04W 88/08* (2013.01)

(56) References Cited

U.S. PATENT DOCUMENTS

| | | | |
|---|---|---|---|
| 2013/0201938 A1* | 8/2013 | Seol | H04W 72/1284 370/329 |
| 2014/0004898 A1 | 1/2014 | Yu et al. | |
| 2014/0185481 A1* | 7/2014 | Seol | H04W 52/24 370/252 |
| 2014/0247796 A1 | 9/2014 | Ouchi et al. | |
| 2014/0293803 A1* | 10/2014 | Wang | H04W 24/02 370/252 |
| 2014/0348051 A1* | 11/2014 | Park | H04W 72/005 370/312 |
| 2015/0382334 A1 | 12/2015 | El Ayach et al. | |
| 2016/0028519 A1* | 1/2016 | Wei | H04B 7/0456 375/267 |
| 2016/0285660 A1* | 9/2016 | Frenne | H04L 27/261 |
| 2016/0295502 A1* | 10/2016 | Yoon | H04W 52/0229 |
| 2017/0207845 A1 | 7/2017 | Moon et al. | |
| 2017/0231011 A1 | 8/2017 | Park et al. | |
| 2017/0302355 A1 | 10/2017 | Islam et al. | |
| 2018/0176945 A1* | 6/2018 | Cao | H04W 72/1268 |
| 2018/0198650 A1* | 7/2018 | Nogami | H04L 5/0094 |
| 2018/0206250 A1* | 7/2018 | Lee | H04W 72/121 |
| 2018/0242300 A1* | 8/2018 | Hakola | H04B 7/086 |
| 2019/0081688 A1* | 3/2019 | Deenoo | H04B 7/088 |

OTHER PUBLICATIONS

Qualcomm Inc: "Multi-beam RACH Design and Evaluation", 3GPP TSG RAN WG1 Meeting #87, R1-1612031, Reno, NV, U.S.A., Nov. 14-18, 2016, pp. 1-11.
Qualcomm Incorporated: "Reciprocity vs Non-reciprocity in Initial Access/RACH", 3GPP Draft; R1-1612037, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 14-18, 2016 (Nov. 5, 2016), 10 Pages, XP051190270, Retrieved from the Internet: URL: http://www.3gpp.org/ftp/tsg_ran/WG1_RL1/TSGR1_87/Docs/ [retrieved on Nov. 5, 2016] the whole document.
International Search Report and Written Opinion—PCT/US2018/016220—ISA/EPO—dated Jun. 5, 2018.
NTT Docomo, et al., "Views on Random Access Channel for NR," 3GPP Draft; R1-1700613 Views on Random Access Channel for NR_Final, 3rd Generation Partnership Project (3GPP), Mobile Competence Centre; 650, Route Des Lucioles; F-06921 Sophia-Antipolis Cedex; FRA, vol. RAN WG1, No. Spokane, USA; Jan. 16, 2017-Jan. 20, 2017, Jan. 16, 2017, 11 pages, XP051208140, Retrieved from the Internet: URL: http://www.3gpp.org/ftp/Meetings_3GPP_SYNC/RAN1/Docs/ [retrieved on Jan. 16, 2017].
Taiwan Search Report—TW107103434—TIPO—dated Jul. 2, 2021.

* cited by examiner

DATA TRANSMISSIONS DURING BASE STATION BEAMSWEEP

CROSS REFERENCES

The present application for patent claims priority to U.S. Provisional Patent Application No. 62/453,410 by Akkarakaran, et al., entitled "Data Transmissions During Base Station Beamsweep," filed Feb. 1, 2017, assigned to the assignee hereof, and is hereby expressly incorporated by reference herein in its entirety.

BACKGROUND

The following relates generally to wireless communication, and more specifically to data transmissions during base station beamsweeping operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communication systems may operate with signal processing techniques, such as beamforming, that may be used to coherently combine energy and form directional beams for transmissions between devices. In systems utilizing beamforming, some transmission time intervals (TTIs) (e.g., subframes, slots, etc.) may be reserved for the directional transmission of certain signals, such as signaling for random access processes or scheduling requests, during which a receiving device is listening for these signals in a particular direction. However, the transmitted signals may not fully occupy a system bandwidth, and may result in an inefficient use of system resources.

SUMMARY

The described techniques relate to improved methods, systems, devices, or apparatuses that support data transmissions during base station beamsweeping operations. Generally, the described techniques provide for the reception of a grant that allocates resources for an uplink transmission by a user equipment (UE) in a system using beamforming. These resources may be used by the UE to transmit data or control information during a time frame in which a base station is listening for signals (e.g., a random access channel (RACH), a scheduling request (SR), or a beam failure recovery request (BFRQ)) with a certain receive beam direction. For example, a UE may be in communication with a serving base station using beamformed transmissions, and the serving base station may provide a resource grant to the UE for uplink transmissions that correspond to a receive beam direction of a beamsweeping operation. In such cases, the beamsweeping operation may be used to listen for the transmission of RACH, SR, BFRQ, or a combination thereof, from various UEs. The UE may then transmit data and/or uplink control information to the serving base station according to the resource grant when the base station is listening in the corresponding receive beam direction.

The resource grant may include an indication of how frequently the base station may change its receive beam direction, and the grant may also include an indication of a transmission duration, a bandwidth to be used, or a reference signal (RS) pattern to be used by the UE. In some examples, the UE may send the uplink transmission to the serving base station, and transmit a RACH to another base station (e.g., for handover procedures) based on the beamsweeping operation, where the uplink transmission and RACH may, in some cases, be transmitted simultaneously.

A method of wireless communication is described. The method may include communicating with a serving base station that performs beamformed transmissions, receiving a resource grant for an uplink transmission to the serving base station, the uplink transmission corresponding to a receive beam direction of a beamsweeping operation performed by the serving base station, and transmitting a communication to the serving base station during the beamsweeping operation and in accordance with the resource grant.

An apparatus for wireless communication is described. The apparatus may include means for communicating with a serving base station that performs beamformed transmissions, means for receiving a resource grant for an uplink transmission to the serving base station, the uplink transmission corresponding to a receive beam direction of a beamsweeping operation performed by the serving base station, and means for transmitting a communication to the serving base station during the beamsweeping operation and in accordance with the resource grant.

Another apparatus for wireless communication is described. The apparatus may include a processor, memory in electronic communication with the processor, and instructions stored in the memory. The instructions may be operable to cause the processor to communicate with a serving base station that performs beamformed transmissions, receive a resource grant for an uplink transmission to the serving base station, the uplink transmission corresponding to a receive beam direction of a beamsweeping operation performed by the serving base station, and transmit a communication to the serving base station during the beamsweeping operation and in accordance with the resource grant.

A non-transitory computer-readable medium for wireless communication is described. The non-transitory computer-readable medium may include instructions operable to cause a processor to communicate with a serving base station that performs beamformed transmissions, receive a resource grant for an uplink transmission to the serving base station, the uplink transmission corresponding to a receive beam direction of a beamsweeping operation performed by the serving base station, and transmit a communication to the serving base station during the beamsweeping operation and in accordance with the resource grant.

In some examples of the method, apparatus, and non-transitory computer-readable medium described above, receiving the resource grant for the uplink transmission comprises: receiving, as part of the resource grant, an indication of a periodicity by which the serving base station changes its receive beam.

Some examples of the method, apparatus, and non-transitory computer-readable medium described above may further include processes, features, means, or instructions for receiving an indication of a periodicity by which the serving base station changes its receive beam, the indication received as part of a radio resource control (RRC) message, a master information block (MIB), a system information block (SIB), a minimum SIB (mSIB), a remaining minimum system information (RMSI), or a combination thereof.

In some examples of the method, apparatus, and non-transitory computer-readable medium described above, receiving the resource grant for the uplink transmission comprises: receiving, as part of the resource grant, an indication of bandwidth to be used for the communication, a duration for which the resource grant may be valid, an RS pattern to be used by the UE, or a combination thereof.

In some examples of the method, apparatus, and non-transitory computer-readable medium described above, transmitting the communication to the serving base station during the beamsweeping operation comprises: partitioning the communication into multiple transmissions, a duration of each of the multiple transmissions based at least in part on a duration of a RACH transmission, an SR transmission, or a BFRQ transmission able to be sent by the UE during the beamsweeping operation.

In some examples of the method, apparatus, and non-transitory computer-readable medium described above, transmitting the communication to the serving base station during the beamsweeping operation comprises: partitioning the communication into multiple transmissions, a duration of each of the multiple transmissions based at least in part on an RS pattern indicated by the serving base station.

In some examples of the method, apparatus, and non-transitory computer-readable medium described above, the RS pattern corresponds to a receive beam pattern used by the serving base station to receive RACH transmissions, SR transmissions, or BFRQ transmissions. In some examples of the method, apparatus, and non-transitory computer-readable medium described above, the receive beam pattern includes a single receive beam to receive RACH transmissions, SR transmissions, or BFRQ transmissions, wherein the single receive beam may be associated with multiple consecutive downlink synchronization beams.

Some examples of the method, apparatus, and non-transitory computer-readable medium described above may further include processes, features, means, or instructions for transmitting the communication with one or more uplink RSs based at least in part on the RS pattern. In some examples of the method, apparatus, and non-transitory computer-readable medium described above, transmitting the communication to the serving base station during the beamsweeping operation comprises: transmitting the communication over multiple orthogonal frequency-division multiplexing (OFDM) symbols during the beamsweeping operation. Some examples of the method, apparatus, and non-transitory computer-readable medium described above may further include processes, features, means, or instructions for transmitting the communication with an RS corresponding to each change in a serving base station receive beam.

Some examples of the method, apparatus, and non-transitory computer-readable medium described above may further include processes, features, means, or instructions for transmitting the RS for one or more OFDM symbols during which the communication may be transmitted. Some examples of the method, apparatus, and non-transitory computer-readable medium described above may further include processes, features, means, or instructions for updating a UE transmit beam used for transmitting the communication at a same periodicity that the serving base station changes its receive beam. Some examples of the method, apparatus, and non-transitory computer-readable medium described above may further include processes, features, means, or instructions for updating the UE transmit beam may be based at least in part on a previous beam training of UE transmit beams corresponding to serving base station receive beams.

Some examples of the method, apparatus, and non-transitory computer-readable medium described above may further include processes, features, means, or instructions for updating the UE transmit beam may be based at least in part on reciprocity between the UE transmit beam and a UE receive beam optimized for an associated downlink synchronization beam of the serving base station. Some examples of the method, apparatus, and non-transitory computer-readable medium described above may further include processes, features, means, or instructions for transmitting a RACH transmission to a second base station while transmitting the communication to the serving base station.

Some examples of the method, apparatus, and non-transitory computer-readable medium described above may further include processes, features, means, or instructions for reducing a transmission rank of the communication during the RACH transmission. Some examples of the method, apparatus, and non-transitory computer-readable medium described above may further include processes, features, means, or instructions for reducing the transmission rank of the communication may be based on a predetermined pattern corresponding to RACH slots.

A method of wireless communication is described. The method may include transmitting a resource grant for an uplink transmission from a UE in communication with the serving base station, the uplink transmission corresponding to one of a set of receive beam directions of a beamsweeping operation performed by the serving base station and receiving a communication from the UE during the beamsweeping operation and in accordance with the resource grant.

An apparatus for wireless communication is described. The apparatus may include means for transmitting a resource grant for an uplink transmission from a UE in communication with the serving base station, the uplink transmission corresponding to one of a set of receive beam directions of a beamsweeping operation performed by the serving base station and means for receiving a communication from the UE during the beamsweeping operation and in accordance with the resource grant.

Another apparatus for wireless communication is described. The apparatus may include a processor, memory in electronic communication with the processor, and instructions stored in the memory. The instructions may be operable to cause the processor to transmit a resource grant for an uplink transmission from a UE in communication with the serving base station, the uplink transmission corresponding to one of a set of receive beam directions of a beamsweeping operation performed by the serving base station and receive a communication from the UE during the beamsweeping operation and in accordance with the resource grant.

A non-transitory computer-readable medium for wireless communication is described. The non-transitory computer-readable medium may include instructions operable to cause a processor to transmit a resource grant for an uplink transmission from a UE in communication with the serving base station, the uplink transmission corresponding to one of a set of receive beam directions of a beamsweeping operation performed by the serving base station and receive a communication from the UE during the beamsweeping operation and in accordance with the resource grant.

Some examples of the method, apparatus, and non-transitory computer-readable medium described above may further include processes, features, means, or instructions for determining that the UE may be in a direction of one or more receive beams of the beamsweeping operation. Some examples of the method, apparatus, and non-transitory computer-readable medium described above may further include processes, features, means, or instructions for including, in the resource grant, one or more resources corresponding to the one or more receive beams.

In some examples of the method, apparatus, and non-transitory computer-readable medium described above, transmitting the resource grant for the uplink transmission comprises: transmitting, as part of the resource grant, an indication of a periodicity by which the serving base station changes its receive beam.

Some examples of the method, apparatus, and non-transitory computer-readable medium described above may further include processes, features, means, or instructions for transmitting an indication of a periodicity by which the serving base station changes its receive beam, the indication transmitted as part of an RRC message, a MIB, a SIB, an mSIB, RMSI, or a combination thereof.

In some examples of the method, apparatus, and non-transitory computer-readable medium described above, receiving the communication from the UE during the beamsweeping operation comprises: receiving the communication over multiple OFDM symbols during the beamsweeping operation. Some examples of the method, apparatus, and non-transitory computer-readable medium described above may further include processes, features, means, or instructions for receiving the communication with a RS corresponding to each change in a serving base station receive beam.

Some examples of the method, apparatus, and non-transitory computer-readable medium described above may further include processes, features, means, or instructions for indicating that the UE may be to use a reduced transmission rank in accordance with a predetermined pattern corresponding to a RACH slot schedule. Some examples of the method, apparatus, and non-transitory computer-readable medium described above may further include processes, features, means, or instructions for receiving the communication from the UE in accordance with the reduced transmission rank.

In some examples of the method, apparatus, and non-transitory computer-readable medium described above, transmitting the resource grant for the uplink transmission comprises: transmitting, as part of the resource grant, an indication of bandwidth to be used for the communication, a duration for which the resource grant may be valid, an RS pattern to be used by the UE, or a combination thereof.

Some examples of the method, apparatus, and non-transitory computer-readable medium described above may further include processes, features, means, or instructions for indicating an RS pattern to the UE, wherein the communication may be partitioned by the UE into multiple transmissions such that a duration of each of the multiple transmissions may be based at least in part on the RS pattern. In some examples of the method, apparatus, and non-transitory computer-readable medium described above, the RS pattern corresponds to a receive beam pattern used by the serving base station to receive RACH transmissions, SR transmissions, or BFRQ transmissions.

In some examples of the method, apparatus, and non-transitory computer-readable medium described above, the receive beam pattern includes a single receive beam to receive RACH transmissions, SR transmissions, or BFRQ transmissions, wherein the single receive beam may be associated with multiple consecutive downlink synchronization beams. Some examples of the method, apparatus, and non-transitory computer-readable medium described above may further include processes, features, means, or instructions for receiving the communication with one or more uplink RSs based at least in part on the RS pattern.

DETAILED DESCRIPTION

Figure 1:
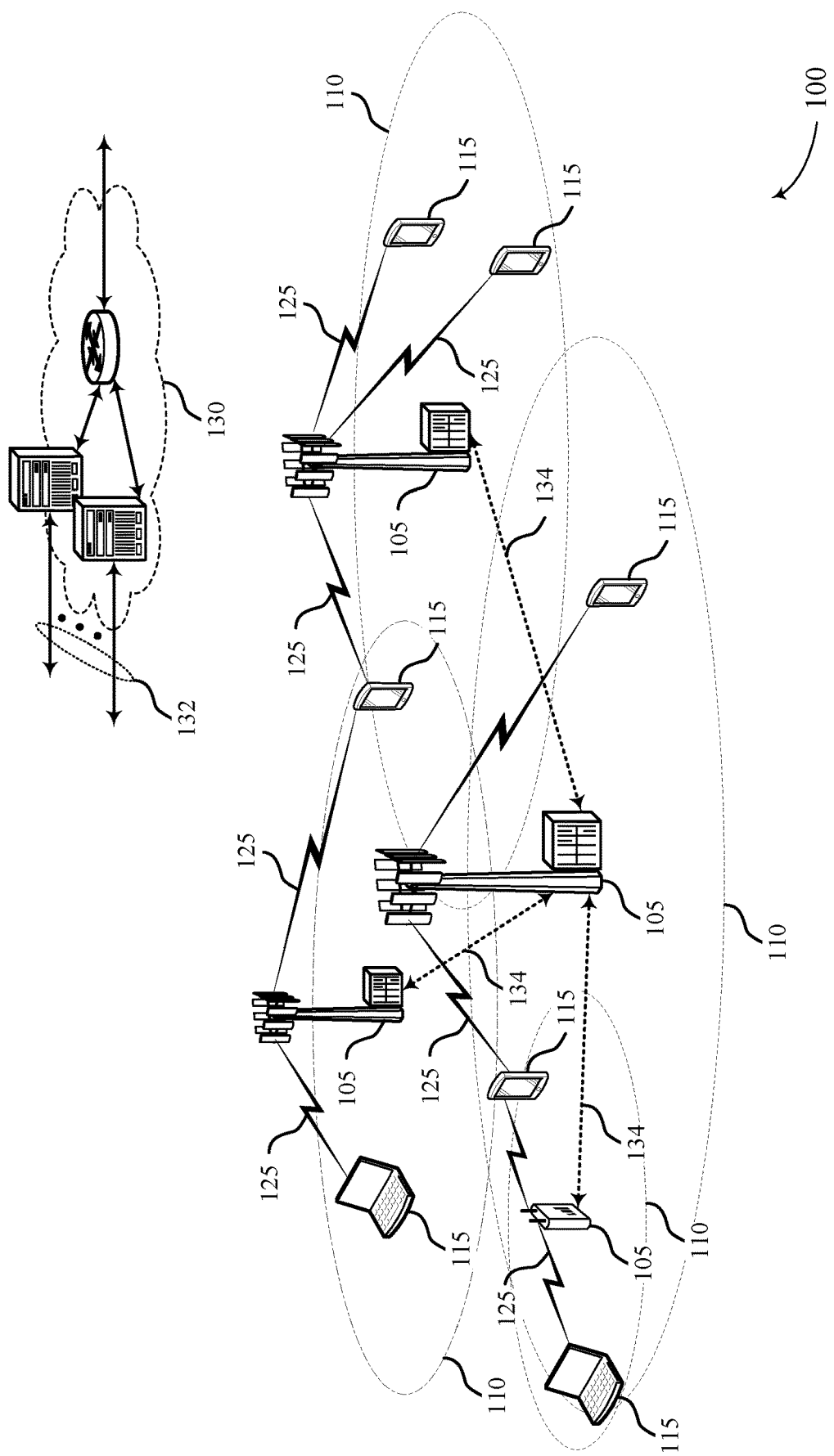
FIG. 1 illustrates an example of a system for wireless communication that supports data transmissions during base station beamsweeping operations in accordance with aspects of the present disclosure.

Some wireless communication systems may operate in frequency ranges that are associated with beamformed transmissions between wireless devices. For example, millimeter wave (mmW) frequency ranges, e.g., 28 gigahertz (GHz), 40 GHz, 60 GHz, etc., may be associated with increased signal attenuation (e.g., path loss), which may be influenced by various factors, such as temperature, barometric pressure, humidity, diffraction, etc. As a result, signal processing techniques, such as beamforming, may be used to coherently combine energy and overcome the path losses in these systems. In such systems, a base station may perform beamsweeping operations, such as a transmission of synchronization signals in a sequence of different directions over a period of time. In some cases, user equipment (UEs) may use the beamsweeping operations for beam training to determine a strongest beam direction. The base station may also listen for transmissions from the UEs in different receive beam directions, where a receive beam direction may change with a certain periodicity (e.g., at each orthogonal frequency-division multiplexing (OFDM) symbol).

In some cases, a number of transmission time intervals (TTIs) (e.g., slots, subframes, etc.) may be reserved for certain types of beamformed transmissions. For example, a slot may be reserved for uplink random access channel (RACH) transmissions used by idle UEs attempting to connect to a base station, or when a connected UE is attempting to connect to another base station (e.g., during handover). A slot may also be reserved for an uplink transmission of a scheduling request (SR) from one or more UEs. Additionally, in a wireless communications system that supports beamforming, the slots used for RACH and SR transmissions may have pre-defined beams and beam directions. However, these RACH and SR transmissions may not use a full system bandwidth. As a result, the unused bandwidth may be coherently utilized for other transmissions corresponding to the same receive beam direction to enhance resource usage and efficiency in the system. That is, uplink data and control information may also be transmitted during the same TTIs used for uplink RACH and SR transmissions and on resources that may be otherwise unused.

By way of example, some UEs may transmit uplink control and/or data during a time period used by a base station for sweeping in different beam directions for receiving RACH (or SR) transmissions. In such cases, the UE may receive a grant providing an assignment of resources for subsequent uplink transmissions. Based on the received grant, the UE may be scheduled for the transmission of uplink control information and/or data, and a transmission duration for these signals may correspond to, or be constrained to, a time interval during which the base station has a fixed receive beam pattern (e.g., a beam pattern that the base station is using to listen for RACH or SR transmissions). That is, the grant transmitted by the base station may allocate resources that coincide with RACH or SR transmission times (and receive beam directions) and that are used by the UE to transmit uplink control information or data. As a result, the base station may schedule uplink transmissions that can be received from the UE using a same beam pattern used to detect RACH or SR transmissions.

In some cases, the UE may associate with another base station through a RACH procedure while communicating control information and/or data to a current base station. The current base station may know that the UE will be sending a RACH message, and may accordingly schedule uplink transmissions for the UE. Alternatively, the current base station may not be aware of a pending RACH procedure by the UE, such as in cases where the RACH process is based on a configured event trigger at the UE. In such scenarios, the UE may defer a transmission of RACH to a different beam or to a later RACH slot to avoid a simultaneous transmission of RACH and uplink control or data. Additionally or alternatively, the UE may have multiple arrays of antennas, and may transmit the RACH and uplink control/data simultaneously, which may avoid the use of a suboptimal transmission beam and avoid latency. In such cases, a rank restriction may be implemented for the transmission of control or data at the same time as RACH, where the rank restriction may depend on UE capability (e.g., a number of antenna arrays), which may be conveyed to the network or base station during a prior connection setup, or may be updated periodically.

Aspects of the disclosure are initially described in the context of a wireless communications system. Further examples are then provided of a beam sweeping pattern, during which uplink transmissions may correspond to a receive beam pattern at a base station. Aspects of the disclosure are further illustrated by and described with reference to apparatus diagrams, system diagrams, and flowcharts that relate to data transmissions during base station beamsweeping operations.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) or LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the efficient use of resources over a full system bandwidth by enabling the transmission of uplink control information and data during a transmission time interval (TTI) reserved for RACH or SR signaling.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Wireless communications system 100 may operate in an ultra-high frequency (UHF) frequency region using frequency bands from 700 megahertz (MHz) to 2600 MHz (2.6 GHz), although in some cases wireless local area networks (WLANs) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 kilometers (km)) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Time intervals in LTE or NR may be expressed in multiples of a basic time unit (which may be a sampling period of $T_s=1/30,720,000$ seconds). Time resources may be organized according to radio frames of length of 10 milliseconds (ms) ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A UE 115 attempting to access a wireless network may perform an initial cell search by detecting a synchronization signal (such as a primary synchronization signal (PSS)) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), and after decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to RACH procedures, paging, physical uplink control channel (PUCCH), physical uplink shared channel (PUSCH), power control, a sounding reference signal (SRS), and cell barring.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance and a temporary cell radio network temporary identifier (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some cases, a base station 105 may transmit synchronization signals over a number of beams that are swept through different beam directions. For example, a base station 105 may transmit synchronization signals on a first beam in a first direction during an OFDM symbol, and during a subsequent OFDM symbol, may transmit the synchronization signal on a second beam in a second direction. The synchronization signal may be swept over different directions in different OFDM symbols, and depending on which symbol the UE 115 receives the strongest signal (from the beam sweeping operation), the UE 115 may identify the beam with which it will receive signals from the base station 105, and due to reciprocity, the UE 115 may transmit in the same direction. That is, a UE 115 may use the synchronization signals to identify an optimal beam for communications (e.g., a strongest received beam), and the UE 115 may also associate its own transmissions to the base station 105 in the same direction. Accordingly, the base station 105 may be aware of which UEs 115 are located in various directions, and which receive beams may be used at the base station 105 to receive signals from these UEs 115.

In some cases, a UE 115 may be transferred from a serving base station 105 (known as the source base station 105) to another base station 105 (known as the target base station 105). For example, the UE 115 may be moving into the coverage area of the target base station 105, or the target base station 105 may be capable of providing better service for the UE 115 or relieving the source base station 105 of excess load. The transition may be referred to as a "handover." Prior to a handover, the source base station 105 may configure the UE 115 with procedures for measuring the signal quality of neighboring base stations 105. The UE 115 may then respond with a measurement report. The source base station 105 may use the measurement report to make the handover decision. The decision may also be based on radio resource management (RRM) factors such as network load and interference mitigation. When the handover decision is made, the source base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the source base station 105, which may include RRC information to be passed on to the UE 115. The source base station 105 may then direct the UE 115 to perform the handover, and pass a status transfer message to the target base station 105 with packet data convergence protocol (PDCP) bearer status information. The UE 115 may attach to the target base station 105 via a RACH procedure.

A base station 105 may insert periodic pilot symbols such as a cell specific reference signal (CRS) to aid UEs 115 in channel estimation and coherent demodulation. CRS may include one of 504 different cell identities. Pilot symbols may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). On the uplink, a UE 115 may transmit a combination of periodic SRS and uplink DMRS for link adaptation and demodulation, respectively. Different RSs may be transmitted by a base station 105 or UE 115, including, for example, beam reference signals (BRSs), channel state information reference signals (CSI-RS), phase noise tracking reference signals (PTRSs), or the like.

In wireless communications system 100, a grant may allocate resources for an uplink transmission by a UE 115, where the resources may be used by the UE 115 to transmit data or control information during a time frame in which a base station 105 is listening for signals (e.g., a RACH, an SR, or a BFRQ) with a certain receive beam direction. For example, a UE 115 may be in communication with a serving base station 105 using beamformed transmissions, and the serving base station 105 may provide a resource grant to the UE 115 for uplink transmissions that correspond to a receive beam direction of a beamsweeping operation. In such cases, the beamsweeping operation may be used to listen for the transmission of RACH, SR, BFRQ, or a combination thereof, from various UEs 115. The UE 115 may then transmit data and/or uplink control information to the serving base station 105 according to the resource grant when the base station 105 is listening in the corresponding receive beam direction. The resource grant may include an indication of how frequently the serving base station 105 may change its receive beam direction, and the grant may also include an indication of a transmission duration, a bandwidth to be used, or an RS pattern to be used by the UE 115. In some cases, the indication of how frequently the serving base station 105 changes its receive beam direction may be indicated semi-statically through signaling sent prior to the grant. For instance, the indication of a periodicity by which the serving base station 105 changes its receive beam may be received as part of an RRC message (e.g., an RRC configuration message), an MIB, an SIB, a minimum SIB (mSIB), a remaining minimum system information (RMSI), or a combination these signals. In some examples, the UE 115 may send the uplink transmission to the serving base station 105, and transmit a RACH to another base station 105 (e.g., for handover procedures) based on the beamsweeping operation, where the uplink transmission and RACH may, in some cases, be transmitted simultaneously depending on the capabilities of the UE 115.

Figure 2:
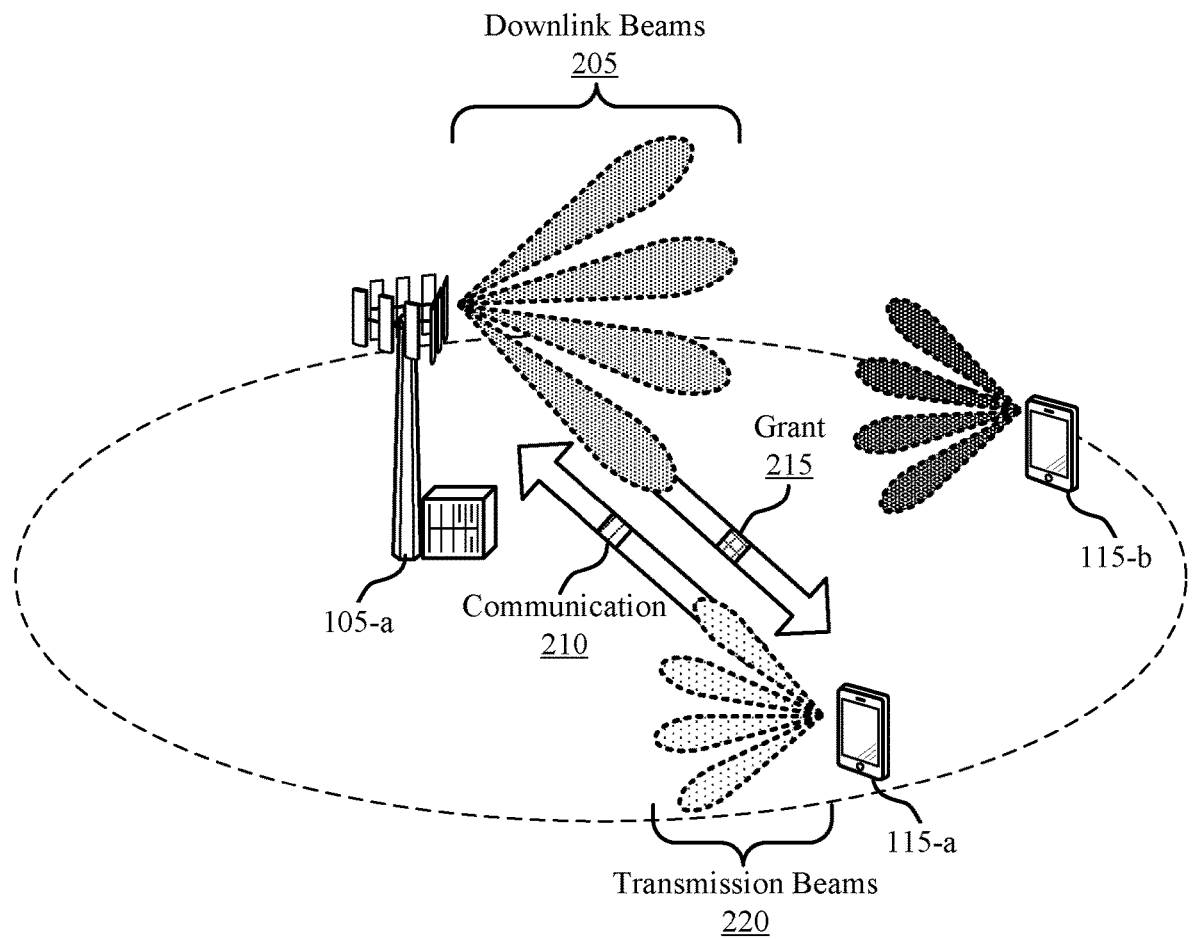
FIG. 2 illustrates an example of a wireless communications system that supports data transmissions during base station beamsweeping operations in accordance with aspects of the present disclosure.

FIG. 2 illustrates an example of a wireless communications system 200 that supports data transmissions during base station beamsweeping operations in accordance with various aspects of the present disclosure. Wireless communications system 200 includes a base station 105-*a* and multiple UEs 115 (e.g., a first UE 115-*a* and a second UE 115-*b*) that may be examples of the corresponding devices as described with reference to FIG. 1. Wireless communications system 200 may support grants used for the assignment of resources that overlap with RACH or SR transmissions and enables an efficient use of system resources through uplink transmissions corresponding to a receive beam direction.

Wireless communications system 200 may operate in frequency ranges that are associated with beamformed transmissions between base station 105-*a*, and first UE 115-*a* or second UE 115-*b*. For example, wireless communications system 200 may operate using mmW frequency ranges. As a result, signal processing techniques, such as beamforming, may be used to coherently combine energy and overcome path losses. In wireless communications system 200, base station 105-a may perform beamsweeping operations, such as a transmission of synchronization signals on different downlink beams 205 in a sequence of different directions, which first UE 115-a and second UE 115-b may use for beam training to find a strongest beam direction. Base station 105-a may also listen for transmissions from the UEs 115 in different receive beam directions, where the receive beam direction may change with a certain periodicity (e.g., each OFDM symbol, every two OFDM symbols, etc.).

In some cases, a number of TTIs (e.g., slots, subframes, etc.) may be reserved for certain types of beamformed uplink transmissions. For example, a slot may be reserved for uplink RACH transmissions used by idle UEs 115 (e.g., UEs 115 in an RRC IDLE mode) attempting to connect to base station 105-a, or when a connected UE 115 (e.g., a UE 115 in an RRC CONNECTED mode) is attempting to connect to another base station 105 (not shown), such as in handover procedures. As an example, second UE 115-b may wake up and transmit RACH to connect to base station 105-a, and base station 105-a may sweep a receive beam during a number of OFDM symbols to listen for the RACH transmission from second UE 115-b. A slot may also be reserved for an uplink transmission of an SR from a UE 115. Slots used for SR transmissions may be, for example, relatively shorter than those used for RACH transmission, and may enable a UE 115 to send an SR without having to go through a full RACH procedure, such as in cases where a connected UE 115 does not have assigned uplink control channel resources (e.g., a PUCCH), or to indicate other events, such as a downlink beam failure, which may utilize SR resources. For example, when indicating the downlink beam failure, a 115 UE may use a specific set of SR resources reserved for beam management or beam failure recovery, and such transmissions may be referred to as a BFRQ (i.e., instead of an SR). Accordingly, an SR and a BFRQ may have similar signaling and resource allocations, but may indicate different information (e.g., an SR indicates that a UE 115 has uplink data to transmit whereas a BFRQ indicates that the UE 115 is unable to detect a signal on one or more active beams).

In wireless communications system 200, the slots used for RACH and SR (or BFRQ) transmissions may be associated with certain beams and beam directions. For instance, base station 105-a may receive signals from various UEs 115 using different beam directions over respective symbol periods (e.g., OFDM symbols). In such cases, each receive beam at base station 105-a may be matched, or may correspond, to a direction of a downlink beam 205 during an OFDM symbol of a downlink synchronization TTI. However, RACH, SR, and BFRQ transmissions may not use a full system bandwidth, and the system bandwidth may be dynamically reconfigured based on anticipated loading in the system. Consequently, the unused bandwidth may be coherently used for other transmissions to enhance resource usage and efficiency in wireless communications system 200. That is, uplink data and control information may also be transmitted during the same TTIs used for uplink RACH, SR, and BFRQ transmissions and on resources that may be otherwise unused.

As an example, first UE 115-a may transmit a communication 210 including uplink control and/or data during a time period used by base station 105-a for sweeping in different beam directions for receiving RACH (or SR/BFRQ). In such cases, first UE 115-a may be connected to base station 105-a and may not need to perform random access or SR procedures, and first UE 115-a may receive a grant 215 providing an assignment of resources for the communication 210. Based on the received grant 215, first UE 115-a may accordingly be scheduled for the transmission of uplink control information (e.g., PUCCH) and data (e.g., PUSCH), and a transmission duration for these signals may correspond to, or be constrained to, a time interval during which base station 105-a has a fixed beam pattern (e.g., a beam pattern that base station 105-a is using to listen for RACH, SR, or BFRQ transmissions). That is, the grant 215 transmitted by base station 105-a may allocate resources that coincide with RACH or SR TTIs and that are used by first UE 115-a to transmit communication 210. As a result, base station 105-a may schedule uplink transmissions that may be received from first UE 115-a using the same beam pattern used to detect RACH, SR, or BFRQ transmissions (such as from second UE 115-b).

By enabling the coherent transmission of uplink data at the same time that base station 105-a is using a receive beam direction to listen for other signals, additional hardware at base station 105-a may be avoided. For example, instead of using a first antenna array for the reception of RACH, SR, or BFRQ transmissions and a second antenna array for the reception of uplink control/data, the same antenna array may be used at base station 105-a for the reception of multiple signals. Accordingly, hardware complexity and cost may be reduced at base station 105-a.

In some cases, first UE 115-a may also need a longer uplink transmission duration (e.g., longer than a duration used for receiving signals on a particular beam). In such cases, base station 105-a may schedule multiple short transmissions, or the grant 215 may schedule a single long transmission (e.g., a single transmission duration that includes multiple short transmissions). In some cases, the multiple transmissions may be consecutive (e.g., adjacent in time). Additionally or alternatively, the multiple transmissions may not be consecutive. That is, a transmission mask may be provided to altogether skip a certain subset of these multiple transmissions. In such cases, those transmissions may correspond to a beamsweeping direction pointed away from UE 115-a, and hence not conducive to receiving signals from UE 115-a during those time periods.

The multiple uplink transmissions may include respective RSs (e.g., a DMRS), as base station 105-a may receive each of the multiple transmissions with different beams (which may be respectively associated with different channel conditions). Additionally, first UE 115-a may change its UE transmission beam 220 for each of the multiple uplink transmissions that may be based on, for example, a previous beam training for respective beam directions, or based on reciprocity, such as if a corresponding UE transmission beam 220 has been optimized for an associated downlink beam 205 received from base station 105-a.

First UE 115-a may determine a partitioning of the communication 210 into the multiple short transmissions. That is, first UE 115-a may determine how often a receive beam changes at base station 105-a, and the multiple transmissions may correspond to the receive beam changes. For instance, first UE 115-a may implicitly determine the partitioning based on a configured duration of each RACH/SR/BFRQ transmission. Additionally or alternatively, the partitioning may be signaled by base station 105-a in the grant 215 sent during a preceding downlink transmission. Base station 105-a may use a single broader beam to receive RACH transmissions associated with two consecutive downlink synchronization beams, and a single uplink RS may be used for both receive beams, which may reduce RS overhead. Additionally, an uplink RS configuration may be signaled in the grant 215. In some cases, a UE transmission beam 220 of first UE 115-a may be based on any one of multiple downlink beams 205 (e.g., downlink synchronization beams), and selection information for a UE transmission beam 220 may also be signaled in the grant 215.

In some cases, first UE 115-a may determine to associate with another base station 105 (not shown) through a RACH procedure while sending the communication 210 to base station 105-a. Base station 105-a may know that first UE 115-a may be sending a RACH message, and may schedule uplink transmissions for first UE 115-a accordingly. Alternatively, base station 105-a may not be aware of a pending RACH procedure by first UE 115-a, such as in cases where the RACH process is based on a configured event trigger at first UE 115-a. In such cases, first UE 115-a may defer a transmission of RACH to a different UE transmission beam 220 (which may be a beam different than an optimal beam) or to a later RACH slot to avoid a simultaneous transmission of RACH and uplink control or data.

However, first UE 115-a may have multiple arrays of antennas, and may transmit the RACH and communication 210 simultaneously, which may avoid the use of a suboptimal UE transmission beam 220 and avoid latency. In such cases, the antenna arrays may not already be used for uplink transmissions of control or data, and a rank restriction may also be implemented for transmission of the communication 210 at the same time as RACH. The amount of a rank restriction may depend on a UE capability (e.g., a number of antenna arrays), which may be conveyed to the network or base station during a prior connection setup, or may be updated periodically (e.g., by RRC messages).

In some examples, for the duration of the event trigger (to send the RACH), a predetermined subset of potential uplink transmissions during RACH slots may be associated with a rank restriction. For example, all uplink transmissions in every sixth RACH slot may have the rank restriction. In some cases, a predetermined pattern of uplink transmissions may be reconfigured explicitly or implicitly by base station 105-a. Implicit reconfiguration may be based on, for example, a set of slots on which prior assignments (e.g., from a prior grant) have been received, or based on a set of beam directions on which beam training signals have been received. Additionally, grants 215 provided by base station 105-a conflicting with the predetermined rank reduction may be identified as detected by a false downlink cyclic redundancy check pass, and ignored. That is, if a received grant 215 indicates that a higher rank be used for uplink data, first UE 115-a may dismiss the information as it may conflict with the predetermined rank reduction. First UE 115-a may transmit RACH during predefined periods that support simultaneous RACH and uplink control/data transmissions. Additionally or alternatively, first UE 115-a may transmit RACH outside of the predetermined periods, such as when there is no uplink control or data assigned though an uplink grant, or if the assignment corresponds to the rank restriction.

Figure 3:
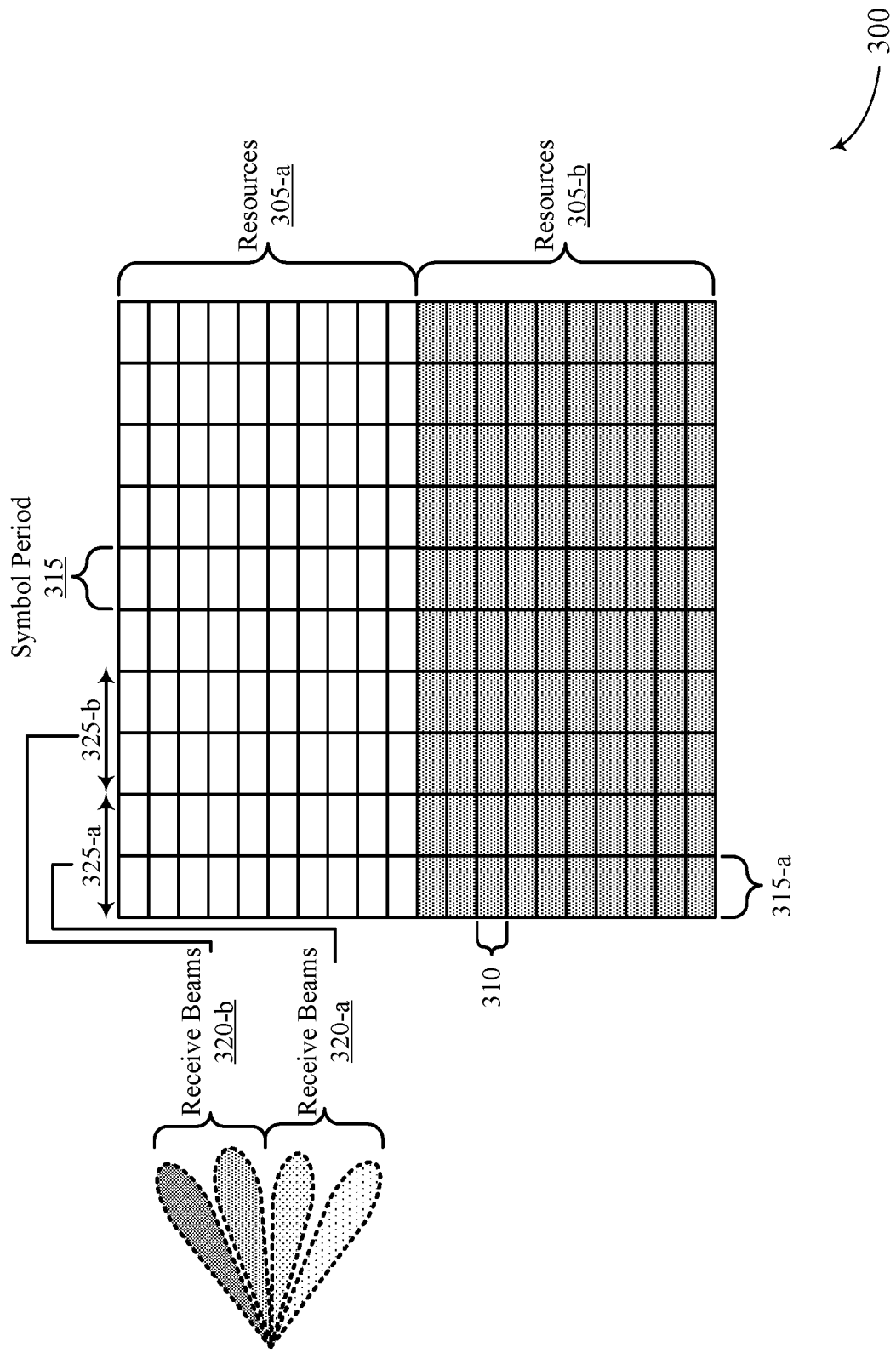
FIG. 3 illustrates an example of uplink resources in a system that supports data transmissions during base station beamsweeping operations in accordance with aspects of the present disclosure.

FIG. 3 illustrates an example of uplink resources 300 in a system that supports data transmissions during base station beamsweeping operations in accordance with various aspects of the present disclosure. The uplink resources 300 may represent aspects of techniques performed by a base station 105 and UE 115 as described with reference to FIGS. 1 and 2. Uplink resources 300 may be an example of different receive beam directions used over different OFDM symbols at a serving base station 105 to receive data during a beamsweeping operation.

Uplink resources 300 may include a first subset of resources 305-a and a second subset of resources 305-b within a system bandwidth. The first subset of resources 305-a and the second subset of resources 305-b may include multiple subcarriers 310 over a number of symbol periods 315 (e.g., OFDM symbol periods). The first subset of resources 305-a may be used for the transmission of RACH by a UE 115 when attempting to connect to a base station 105. Alternatively, the first subset of resources 305-a may be used for the transmission of an SR or BFRQ by a UE 115.

The base station 105 may perform a beamsweeping operation to sequentially sweep receive beams 320 over a number of different directions during respective symbol periods 315. For example, a first set of receive beams 320-a may be swept over a first set of symbol periods 325-a, where respective beams in the first set of receive beams 320-a may point in a different direction during respective symbol periods 315 of the first set of symbol periods 325-a. Likewise, a second set of receive beams 320-b may be swept over a corresponding set of symbol periods 325-b, and so forth. The beam sweep operation may be used to identify any RACH sequences (or SRs/BFRQs) that are, for example, transmitted over the first subset of resources 305-a by a UE 115.

As discussed above, a UE 115 that is connected to the base station 105 may also transmit uplink control information and/or data during the symbol periods 315 that correspond to a receive beam direction for the reception of RACH or SR. For example, the base station 105 may transmit a resource grant that enables the UE 115 to transmit a communication (e.g., including PUCCH and/or PUSCH) using the second subset of resources 305-b that is different than the first subset of resources 305-a. In such cases, the resources assigned by the grant may overlap in time with the resources used, for example, by another UE 115 to transmit RACH. In some examples, the grant sent by the base station 105 may have an implicit assignment of resources that correspond to different receive beam directions. The grant may include an indication of where the resource assignment for the UE 115 is located at over the system bandwidth (e.g., the second subset of resources 305-b), as the UE 115 may already be aware that the respective time period is associated with a beamsweep operation. In one example, the UE 115 may know how often the receive beam 320 changes, and may also know the structure of a RACH slot (e.g., the resources, duration, and/or timing of a slot used for random access transmissions) from when the UE 115 connected to the base station 105. In some cases, the grant may also include a dynamic indication of how frequently the receive beam 320 will change direction during the beamsweep operation. Additionally or alternatively, the indication of how frequently the base station 105 changes its receive beam direction may be indicated semi-statically through signaling sent prior to the grant. For instance, the indication of a periodicity by which the serving base station 105 changes its receive beam 320 may be received as part of an RRC message (e.g., an RRC configuration message), an MIB, an SIB, an mSIB, RMSI, or a combination these signals. An mSIB may comprise information needed prior to the transmission of RACH, which may include the MIB and RMSI. Additionally, the RMSI may refer to information that may have been excluded from the MIB.

As an example, a base station 105 may sweep the first set of receive beams 320-a through the first set of symbol periods 325-a. The resource grant may be provided such that a UE 115 is assigned resources for an uplink transmission during a first symbol period 315-a of the first set of symbol periods 325-a. As a result, a receive beam direction corresponding to the first symbol period 315-a may be used for the reception of any RACH transmission and the assigned uplink transmission from the UE 115.

In some cases, the UE 115 may need to transmit a larger amount of data, and may partition a communication into multiple transmissions that coincide with different receive beam directions. For instance, the UE 115 may partition a communication into multiple transmissions over two or more symbol periods 315, such as two symbol periods 315 of the first set of symbol periods 325-a. In such cases, a single grant may enable the UE 115 to transmit over the multiple symbol periods 315 so as to reduce downlink signaling overhead. Additionally, the UE 115 may transmit an RS (e.g., a DMRS) along with the uplink communication during each symbol period 315 that coincides with a receive beam direction. That is, a DMRS may be transmitted in respective receive beam directions. The RSs may be transmitted in accordance with an RS pattern, which may be based on information provided in the grant, such as how frequently the receive beams 320 change directions.

Figure 4:
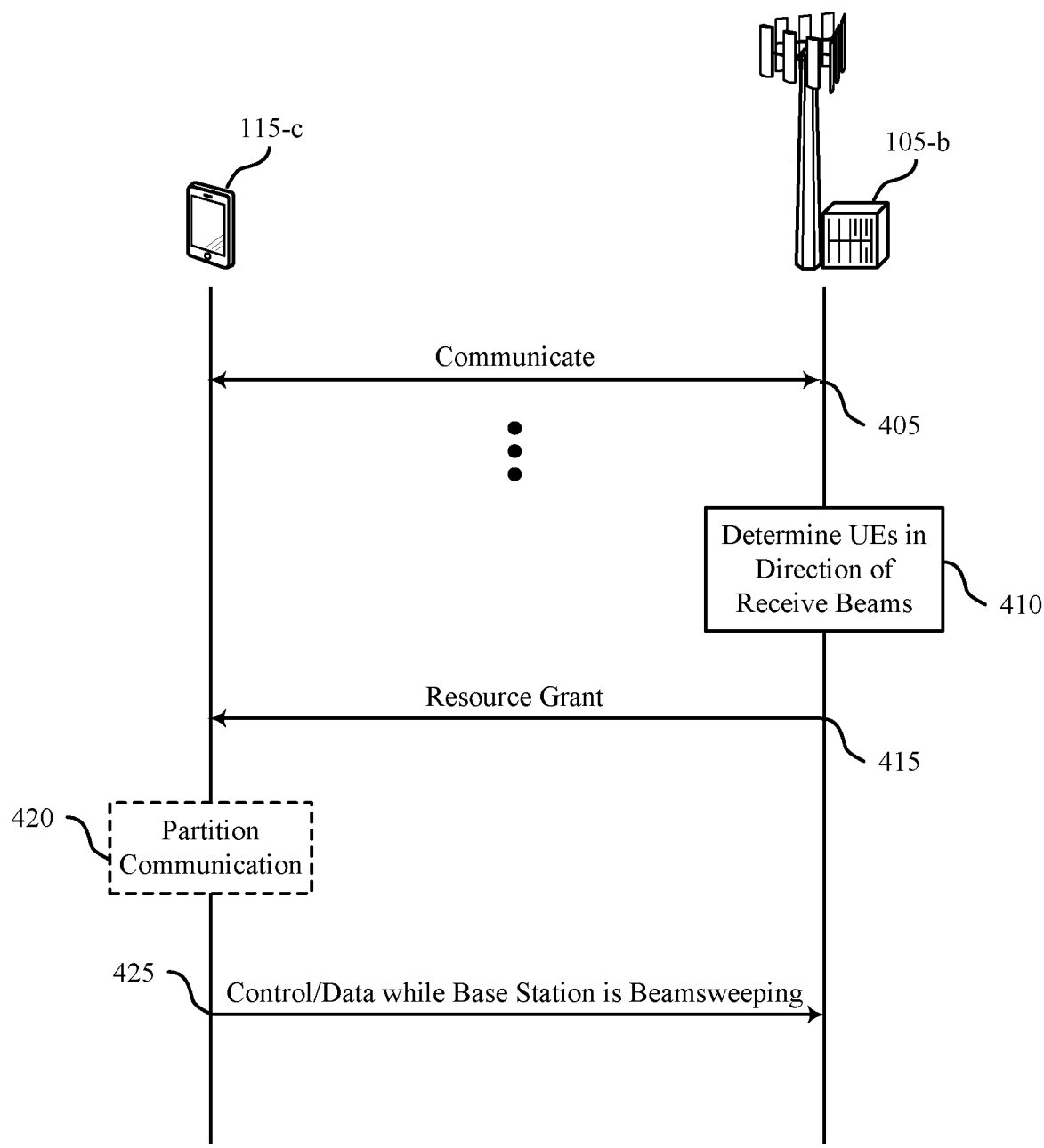
FIGS. 4 and 5 illustrate examples of process flows in a system that supports data transmissions during base station beamsweeping operations in accordance with aspects of the present disclosure.

FIG. 4 illustrates an example of a process flow 400 that supports data transmissions during base station beamsweeping operations in accordance with various aspects of the present disclosure. Process flow 400 includes a base station 105-b and UE 115-c, which may be examples of the corresponding devices as described with reference to FIGS. 1 and 2. Process flow 400 may illustrate an example of the transmission of a resource grant that enables a UE 115 to communicate uplink control information and/or data to a base station 105, where the uplink communication corresponds to a receive beam pattern used to receive other signals (such as RACH or SR).

At 405, UE 115-c may communicate with base station 105-b, and the communication may employ beamformed transmissions. As an example, UE 115-c may be connected to (e.g., an RRC connected mode) and may have performed a prior beam training with base station 105-b. That is, based on downlink synchronization signals sent by base station 105-b, UE 115-c may have identified a beam direction by which to communicate with base station 105-b. As a result, base station 105-b may know the corresponding direction of UE 115-c.

At 410, base station 105-b may determine that one or more UEs 115 (e.g., including UE 115-c) are in a direction of one or more receive beams of a beamsweeping operation. In such cases, base station 105-b may determine that it will provide an assignment of resources to UE 115-c, and the resources may be based on a beamsweeping operation used by base station 105-b for the reception of RACH, SR, or BFRQ. That is, the resources provided by a grant may be scheduled such that a transmitted communication from UE 115-c may be received when a base station receive beam is in a certain direction.

At 415, base station 105-b may transmit, and UE 115-c may receive, a resource grant for an uplink transmission to base station 105-b, and the uplink transmission may correspond to a receive beam direction of the beamsweeping operation performed by base station 105-b. Base station 105-b may include in the resource grant one or more resources corresponding to one or more receive beams. In some cases, UE 115-c may receive, as part of the resource grant, an indication of a periodicity by which base station 105-b changes its receive beam. In some examples, UE 115-c may receive an indication of the periodicity by which base station 105-b changes its receive beam, and the indication may be received as part of an RRC message, an MIB, an SIB, an mSIB, RMSI, or a combination thereof. Additionally or alternatively, UE 115-c may receive, as part of the resource grant, an indication of a bandwidth to be used for a communication, a duration for which the resource grant is valid, an RS pattern to be used by UE 115-c, or combinations thereof.

In some cases, UE 115-c may have enough data to transmit such that a longer time frame is needed for a communication. Accordingly, at 420, UE 115-c may optionally partition the communication into multiple transmissions, where a duration of each of the multiple transmissions may be based on a duration of a RACH transmission, or an SR transmission, or a BFRQ transmission (or a combination thereof) that the one or more UEs 115 (e.g., including UE 115-c) are configured to transmit during the beamsweeping operation. In some cases, UE 115-c may partition the communication into multiple transmissions, where the duration of each of the multiple transmissions may be based on an RS pattern indicated by base station 105-b. In some examples, the RS pattern may correspond to a receive beam pattern used by base station 105-b to receive RACH transmissions or SR transmissions. Additionally, the receive beam pattern may include a single receive beam to receive RACH transmissions or SR transmissions associated with multiple consecutive downlink synchronization beams.

At 425, UE 115-c may transmit the communication to base station 105-b during the beamsweeping operation and in accordance with the resource grant. The communication may include uplink control information (e.g., PUCCH) or uplink data (e.g., PUSCH), or a combination thereof. In some examples, the communication may be transmitted during a time frame in which the base station receive beam is in a fixed beam pattern. In some cases, UE 115-c may transmit the communication with one or more uplink RSs based at least in part on the RS pattern. In some examples, UE 115-c may transmit the communication over multiple OFDM symbols during the beamsweeping operation, and UE 115-c may transmit an RS for each OFDM symbol during which the communication is transmitted. Additionally or alternatively, the RS may be transmitted for a set of OFDM symbols during which the communication is transmitted (e.g., an RS for each set of two or more OFDM symbols). As an example, an RS may be transmitted with a RACH preamble having a duration of two OFDM symbols. In some examples, UE 115-c may transmit the communication with an RS corresponding to each change in the serving base station's receive beam. For instance, base station 105-b may change its receive beam at different times and, for each change, a respective RS may be transmitted. In such cases, an RS associated with a receive beam prior to the change may be obsolete. The transmission of respective RSs may be based on how frequently the receive beam changes at base station 105-b, and the number of RSs sent in the uplink may differ according to the receive beam changes. For example, if the beam changes every symbol period, then a respective RS may be transmitted in each of those symbol periods.

In some examples, UE 115-c may update a UE transmit beam used for transmitting the communication at a same periodicity that the base station 105-b changes its receive beam. Additionally, updating the UE transmit beam may be based on a previous beam training of UE transmit beams corresponding to serving base station receive beams. In some cases, updating the UE transmit beam may be based on reciprocity between the UE transmit beam and a UE receive beam optimized for an associated downlink synchronization beam of the base station 105-b.

Figure 5:
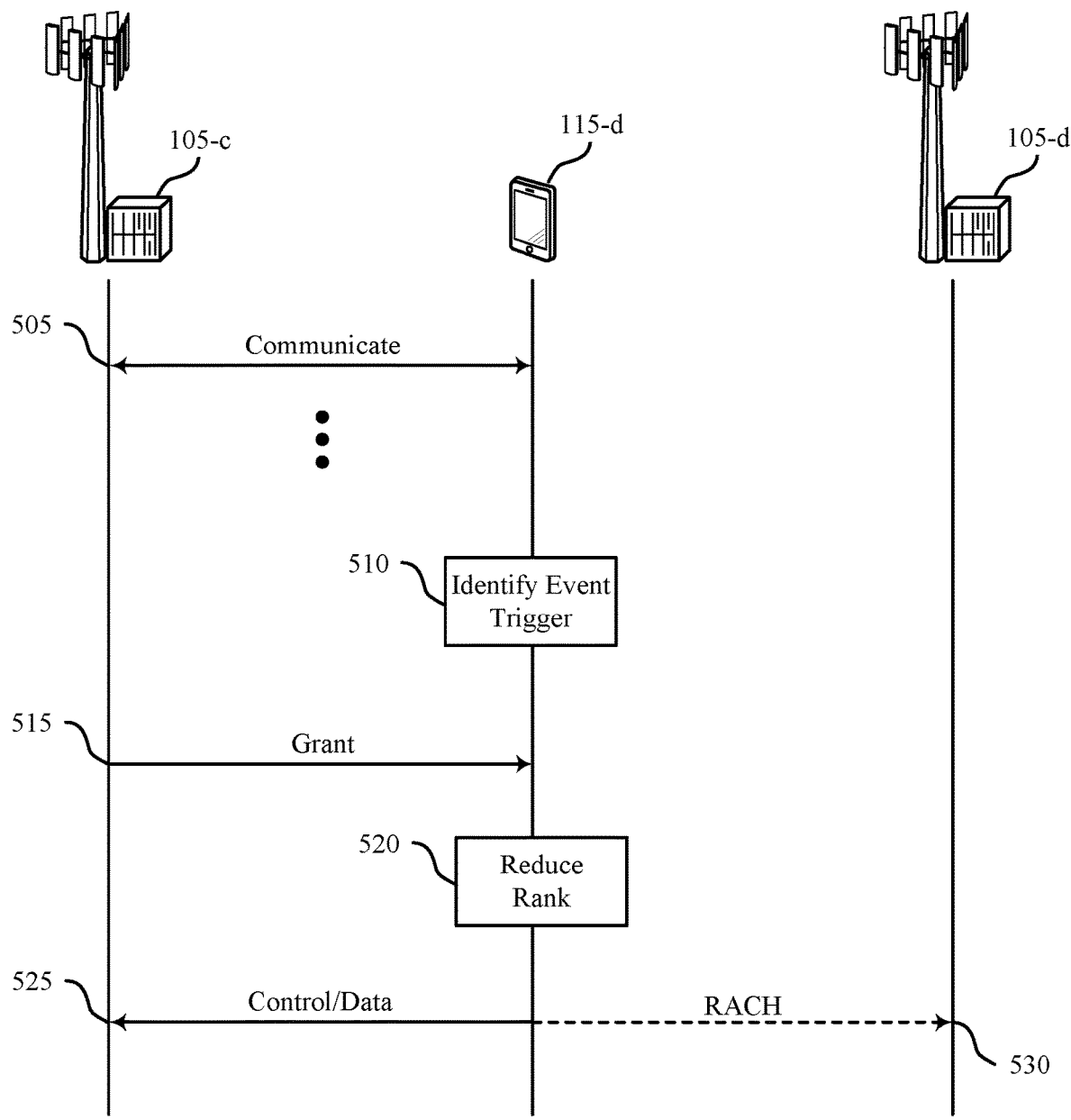

FIG. 5 illustrates an example of a process flow 500 that supports data transmissions during base station beamsweeping operations in accordance with various aspects of the present disclosure. Process flow 500 includes a serving base station 105-c, second base station 105-d, and UE 115-d, which may be examples of the corresponding devices as described with reference to FIGS. 1 and 2. Process flow may illustrate an example of a handover procedure from a serving base station 105 to another base station 105, where a UE 115 may be capable of simultaneous transmissions of RACH and an uplink data/control information.

At 505, UE 115-d may communicate with serving base station 105-c, and the communication may employ beamformed transmissions. As an example, UE 115-d may be connected to (e.g., an RRC connected mode) and may have performed a prior beam training with serving base station 105-c. At 510, UE 115-d may identify an event trigger where UE 115-d may send RACH to second base station 105-d. For instance, UE 115-d may identify a configured event trigger in which UE 115-d may switch from serving base station 105-c to second base station 105-d using a contention-free RACH. Additionally or alternatively, UE 115-d may determine that a signal from second base station 105-d is becoming stronger than a signal from serving base station 105-c (e.g., based on a certain dB value or threshold), and UE 115-d may send RACH to second base station 105-d as a result.

At 515, serving base station 105-c may transmit a resource grant to UE 115-d for an uplink transmission, and the uplink transmission may correspond to a receive beam direction of the beamsweeping operation performed by base station 105-c. Serving base station 105-c may include, in the resource grant, one or more resources corresponding to one or more receive beams. In some cases, UE 115-d may receive, as part of the resource grant, an indication of a periodicity by which serving base station 105-c changes its receive beam. In some examples, UE 115-d may receive a prior indication of the periodicity by which serving base station 105-c changes its receive beam. In such cases, the indication may be received as part of an RRC message, an MIB, an SIB, an mSIB, RMSI, or a combination thereof, which may be signaled prior to the resource grant. Additionally or alternatively, UE 115-d may receive, as part of the resource grant, an indication of bandwidth to be used for a communication, a duration for which the resource grant is valid, an RS pattern to be used by UE 115-d, or combinations thereof.

In some examples, UE 115-d may have multiple antenna arrays, and may be capable of transmitting a communication to serving base station 105-c and a RACH transmission to second base station 105-d at the same time (e.g., UE 115-d may be capable of transmitting concurrent beamformed signals in two different directions). Accordingly, at 520, UE 115-d may reduce a transmission rank of the communication during the RACH transmission. In some cases, reducing the transmission rank of the communication is based on a predetermined pattern corresponding to RACH slots. That is, a transmission of the communication during a RACH slot may correspond to a lower rank for the communication.

At 525, UE 115-d may transmit the communication to serving base station 105-c during the beamsweeping operation and in accordance with the resource grant. The communication may include uplink control information (e.g., PUCCH) or uplink data (e.g., PUSCH), or a combination thereof. In some examples, the communication may be transmitted during a time frame in which the base station receive beam is in a fixed beam pattern. In some cases, UE 115-d may transmit the communication with one or more uplink RSs based at least in part on the RS pattern. In some examples, UE 115-d may transmit the communication over multiple OFDM symbols during the beamsweeping operation. In some cases, UE 115-d may transmit an RS for one or more OFDM symbols during which the communication is transmitted. In some examples, UE 115-d may transmit the communication with an RS corresponding to each change in the serving base station receive beam.

At 530, UE 115-d may transmit a RACH transmission to second base station 105-d while transmitting the communication to serving base station 105-c. In other examples, UE 115-d may not have a capability to transmit the communication simultaneously with the RACH transmission. In such cases, UE 115-d may defer the RACH transmission to second base station 105-d to a different beam, or to a later RACH slot (or a subsequent OFDM symbol), such that UE 115-d avoids simultaneous transmission of the communication and RACH.

Figure 6:
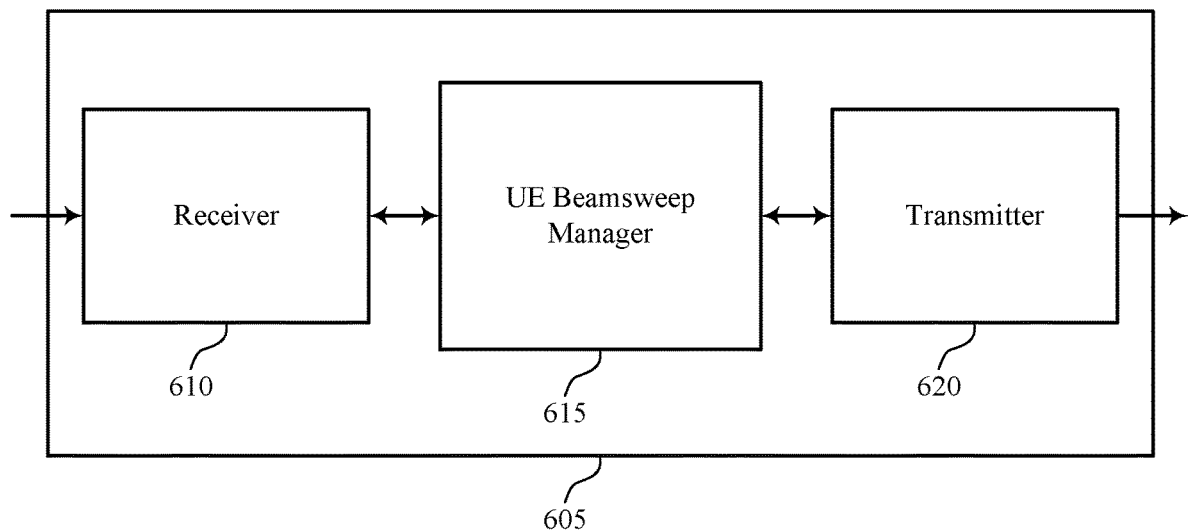
FIGS. 6 through 8 show block diagrams of a device that supports data transmissions during base station beamsweeping operations in accordance with aspects of the present disclosure.

FIG. 6 shows a block diagram 600 of a wireless device 605 that supports data transmissions during base station beamsweeping operations in accordance with various aspects of the present disclosure. Wireless device 605 may be an example of aspects of a UE 115 as described with reference to FIGS. 1 and 2. Wireless device 605 may include receiver 610, UE beamsweep manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to data transmissions during base station beamsweep, etc.). Information may be passed on to other components of the device. The receiver 610 may be an example of aspects of the transceiver 935 described with reference to FIG. 9.

UE beamsweep manager 615 may be an example of aspects of the UE beamsweep manager 915 described with reference to FIG. 9. UE beamsweep manager 615 and/or at least some of its various sub-components may be implemented in hardware, software executed by a processor, firmware, or any combination thereof. If implemented in software executed by a processor, the functions of the UE beamsweep manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE beamsweep manager 615 and/or at least some of its various sub-components may be physically located at various positions, including being distributed such that portions of functions are implemented at different physical locations by one or more physical devices. In some examples, UE beamsweep manager 615 and/or at least some of its various sub-components may be a separate and distinct component in accordance with various aspects of the present disclosure. In other examples, UE beamsweep manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE beamsweep manager 615 may communicate with a serving base station 105 that performs beamformed transmissions and receive a resource grant for an uplink transmission to the serving base station 105, the uplink transmission corresponding to a receive beam direction of a beamsweeping operation performed by the serving base station 105. UE beamsweep manager 615 may transmit a communication to the serving base station 105 during the beamsweeping operation and in accordance with the resource grant.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
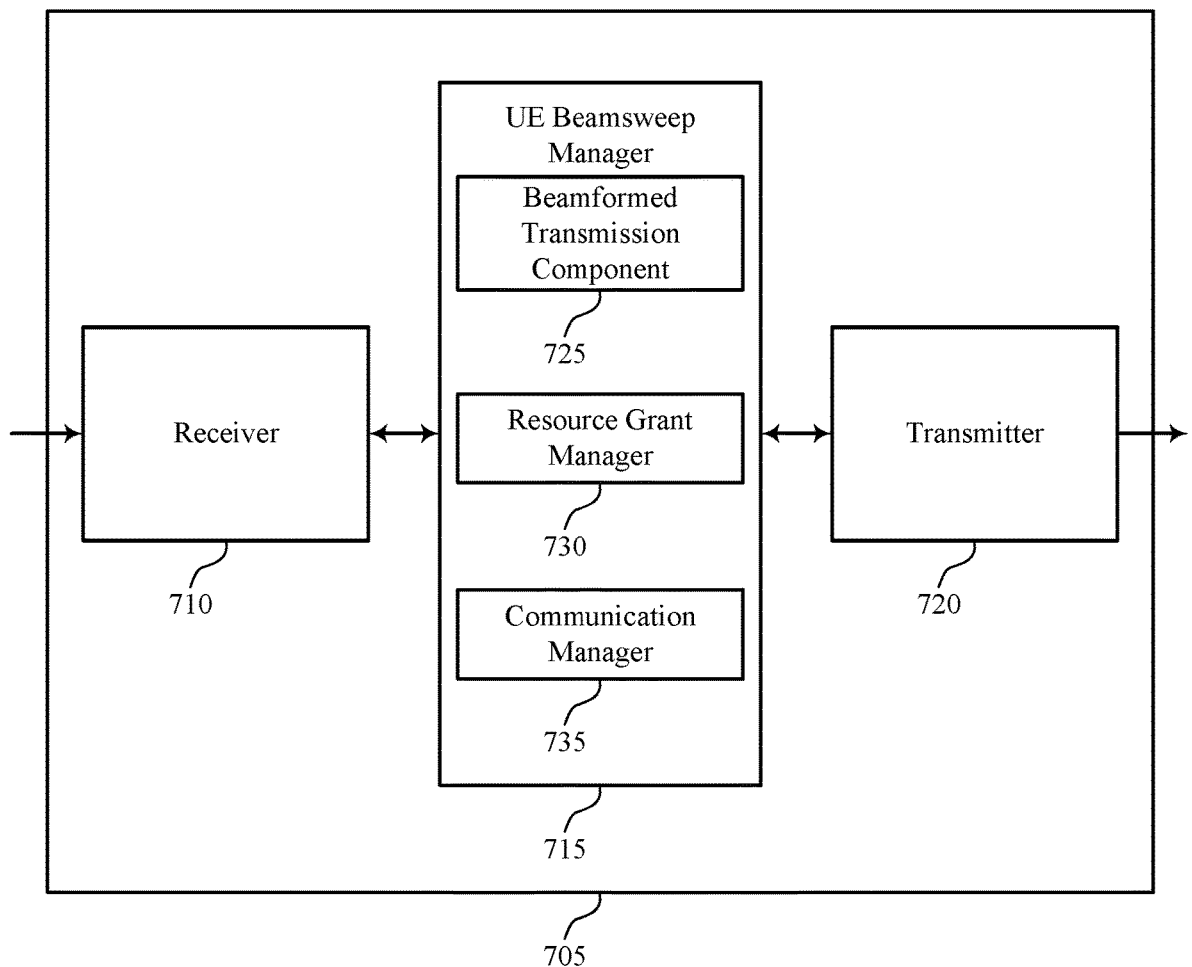

FIG. 7 shows a block diagram 700 of a wireless device 705 that supports data transmissions during base station beamsweeping operations in accordance with various aspects of the present disclosure. Wireless device 705 may be an example of aspects of a wireless device 605 or a UE 115 as described with reference to FIGS. 1, 2, and 6. Wireless device 705 may include receiver 710, UE beamsweep manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to data transmissions during base station beamsweep, etc.). Information may be passed on to other components of the device. The receiver 710 may be an example of aspects of the transceiver 935 described with reference to FIG. 9.

UE beamsweep manager 715 may be an example of aspects of the UE beamsweep manager 915 described with reference to FIG. 9. UE beamsweep manager 715 may also include beamformed transmission component 725, resource grant manager 730, and communication manager 735. In some examples, beamformed transmission component 725 may communicate with a serving base station 105 that performs beamformed transmissions.

Resource grant manager 730 may receive a resource grant for an uplink transmission to the serving base station 105, the uplink transmission corresponding to a receive beam direction of a beamsweeping operation performed by the serving base station 105 and receive, as part of the resource grant, an indication of a periodicity by which the serving base station 105 changes its receive beam. In some cases, receiving the resource grant for uplink transmission includes receiving, as part of the resource grant, an indication of a periodicity by which the serving base station 105 changes its receive beam. In some cases, receiving the resource grant for uplink transmission includes receiving, as part of the resource grant, an indication of bandwidth to be used for the communication, a duration for which the resource grant is valid, an RS pattern to be used by the UE 115 (or by a plurality of UEs 115), or combinations thereof.

Communication manager 735 may transmit a communication to the serving base station 105 during the beamsweeping operation and in accordance with the resource grant and transmit the communication during a time frame in which the base station receive beam is in a fixed beam pattern. In some cases, transmitting the communication to the serving base station 105 during the beamsweeping operation includes transmitting the communication over multiple OFDM symbols during the beamsweeping operation. In other cases, transmitting the communication to the serving base station 105 during the beamsweeping operation includes transmitting the communication during a single OFDM symbol during the beamsweeping operation. In some examples, communication manager 735 may transmit the communication during a time frame in which the base station receive beam is in a fixed beam pattern.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
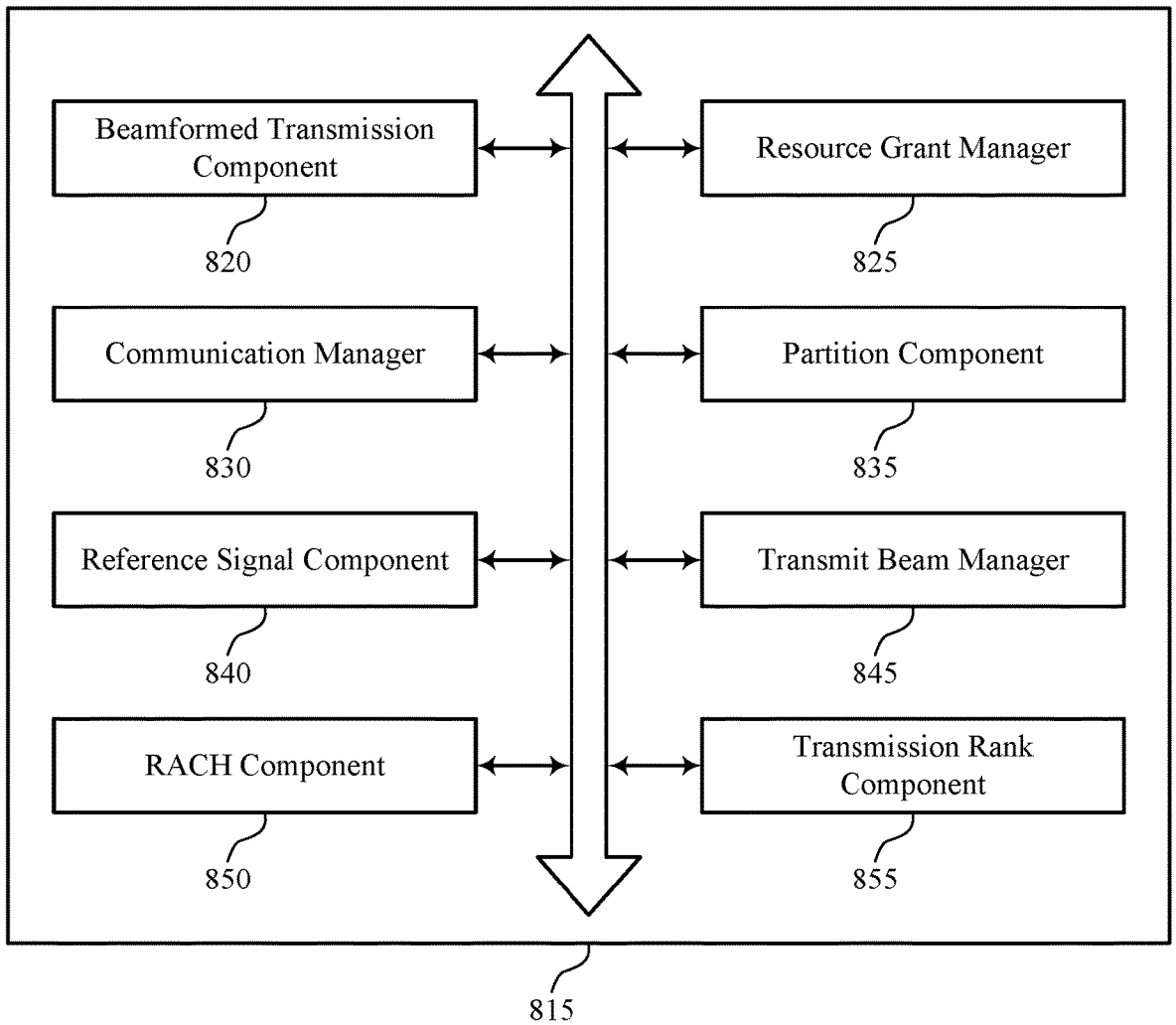

FIG. 8 shows a block diagram 800 of a UE beamsweep manager 815 that supports data transmissions during base station beamsweeping operations in accordance with various aspects of the present disclosure. The UE beamsweep manager 815 may be an example of aspects of a UE beamsweep manager 615, a UE beamsweep manager 715, or a UE beamsweep manager 915 described with reference to FIGS. 6, 7, and 9. The UE beamsweep manager 815 may include beamformed transmission component 820, resource grant manager 825, communication manager 830, partition component 835, reference signal component 840, transmit beam manager 845, RACH component 850, and transmission rank component 855. Each of these modules may communicate, directly or indirectly, with one another (e.g., via one or more buses).

Beamformed transmission component 820 may communicate with a serving base station 105 that performs beamformed transmissions. Resource grant manager 825 may receive a resource grant for an uplink transmission to the serving base station 105, the uplink transmission corresponding to a receive beam direction of a beamsweeping operation performed by the serving base station 105. In some cases, receiving the resource grant for uplink transmission includes receiving, as part of the resource grant, an indication of a periodicity by which the serving base station 105 changes its receive beam. In some cases, receiving the resource grant for uplink transmission includes receiving, as part of the resource grant, an indication of bandwidth to be used for the communication, a duration for which the resource grant is valid, an RS pattern to be used by the UE 115, or combinations thereof.

Communication manager 830 may transmit a communication to the serving base station 105 during the beamsweeping operation and in accordance with the resource grant and transmit the communication during a time frame in which the base station receive beam is in a fixed beam pattern. In some cases, transmitting the communication to the serving base station 105 during the beamsweeping operation includes transmitting the communication over multiple OFDM symbols during the beamsweeping operation. In some cases, transmitting the communication to the serving base station 105 during the beamsweeping operation includes transmitting the communication during a single OFDM symbol during the beamsweeping operation. In some examples, communication manager 830 may transmit the communication during a time frame in which the base station receive beam is in a fixed beam pattern. In some cases, communication manager 830 may transmit the communication with one or more uplink RSs based on an RS pattern.

Partition component 835 may partition the communication into multiple transmissions, a duration of each of the multiple transmissions based on a duration of a RACH transmission, an SR transmission, or BFRQ transmission that the UE 115 is configured to transmit during the beam-sweeping operation. In some cases, partition component 835 may partition the communication into multiple transmissions, a duration of each of the multiple transmissions based on the RS pattern indicated by the serving base station 105. In some cases, the RS pattern corresponds to a receive beam pattern used by the serving base station 105 to receive RACH transmissions, SR transmissions, or BFRQ transmissions. In some cases, the receive beam pattern includes a single receive beam to receive RACH transmissions, SR transmissions, or BFRQ transmissions associated with multiple consecutive downlink synchronization beams.

Reference signal component 840 may transmit the communication with an RS corresponding to each change in the serving base station receive beam. In some examples, reference signal component 840 may transmit an RS for one or more OFDM symbols during which the communication is transmitted. Transmit beam manager 845 may update a UE transmit beam used for transmitting the communication at a same periodicity that the serving base station 105 changes its receive beam. In some cases, updating the UE transmit beam is based on a previous beam training of UE transmit beams corresponding to serving base station receive beams. Transmit beam manager 845 may also update the UE transmit beam based on reciprocity between the UE transmit beam and a UE receive beam optimized for an associated downlink synchronization beam of the serving base station 105. In some cases, transmit beam manager 845 may receive an indication of a periodicity by which the serving base station 105 changes its receive beam, where the indication may be received as part of an RRC message (e.g., an RRC control message), an MIB, an SIB, an mSIB, RMSI, or a combination thereof.

RACH component 850 may transmit a RACH transmission to a second base station 105 while transmitting the communication to the serving base station 105. Transmission rank component 855 may reduce a transmission rank of the communication during the RACH transmission, where reducing the transmission rank of the communication may be based on a predetermined pattern corresponding to RACH slots.

Figure 9:
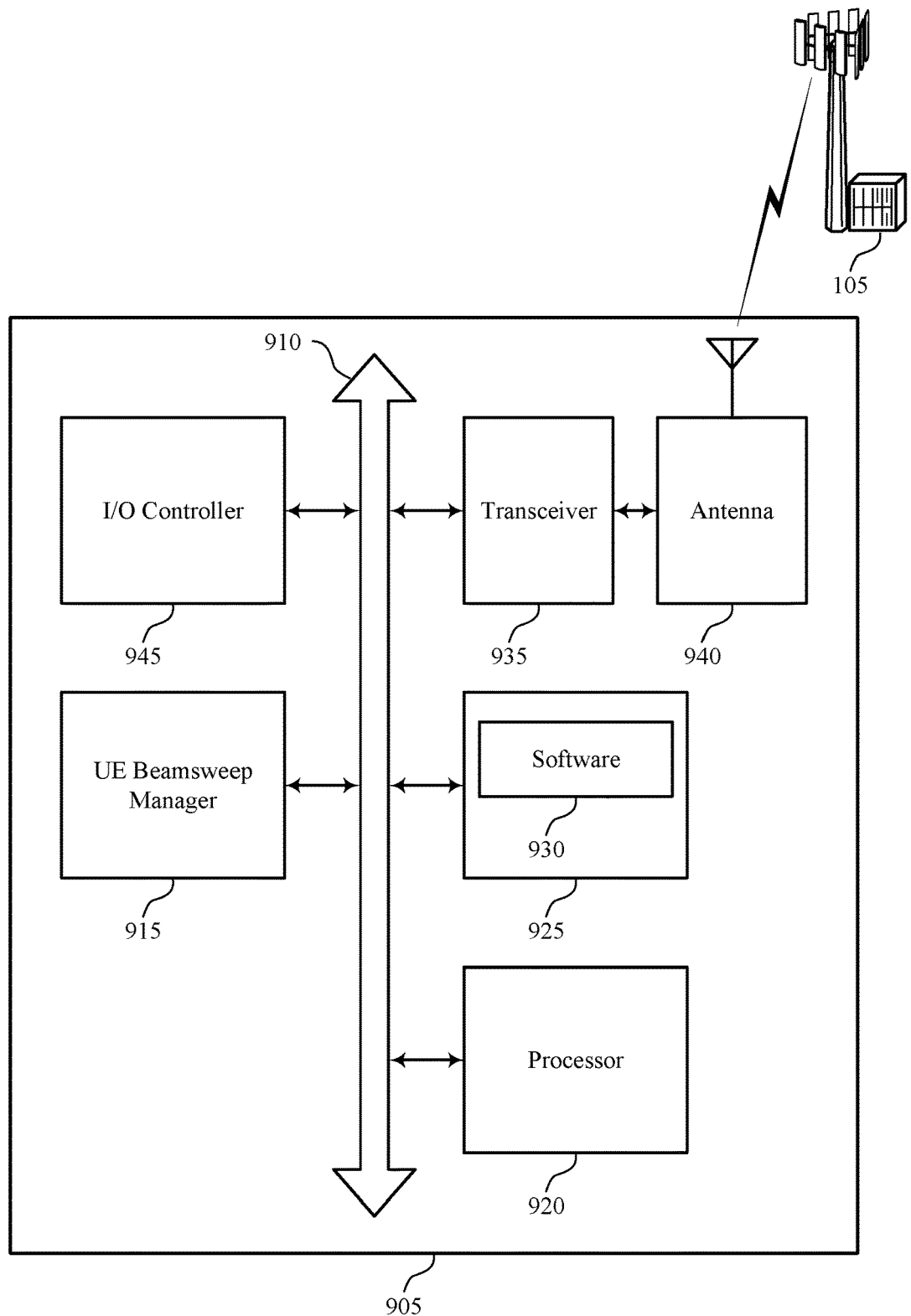
FIG. 9 illustrates a block diagram of a system including a user equipment (UE) that supports data transmissions during base station beamsweeping operations in accordance with aspects of the present disclosure.

FIG. 9 shows a diagram of a system 900 including a device 905 that supports data transmissions during base station beamsweeping operations in accordance with various aspects of the present disclosure. Device 905 may be an example of or include the components of wireless device 605, wireless device 705, or a UE 115 as described above, e.g., with reference to FIGS. 1, 2, 6 and 7. Device 905 may include components for bi-directional voice and data communications including components for transmitting and receiving communications, including UE beamsweep manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting data transmissions during base station beamsweep).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support data transmissions during base station beamsweeping operations. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
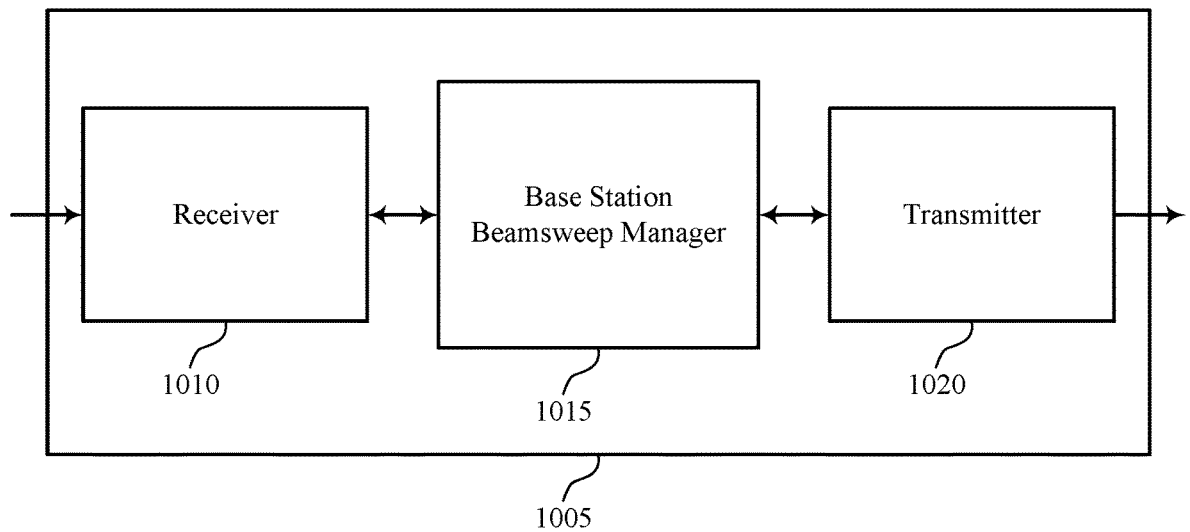
FIGS. 10 through 12 show block diagrams of a device that supports data transmissions during base station beamsweeping operations in accordance with aspects of the present disclosure.

FIG. 10 shows a block diagram 1000 of a wireless device 1005 that supports data transmissions during base station beamsweeping operations in accordance with various aspects of the present disclosure. Wireless device 1005 may be an example of aspects of a base station 105 as described with reference to FIGS. 1 and 2. Wireless device 1005 may include receiver 1010, base station beamsweep manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to data transmissions during base station beamsweep, etc.). Information may be passed on to other components of the device. The receiver 1010 may be an example of aspects of the transceiver 1335 described with reference to FIG. 13.

Base station beamsweep manager 1015 may be an example of aspects of the base station beamsweep manager 1315 described with reference to FIG. 13. Base station beamsweep manager 1015 and/or at least some of its various sub-components may be implemented in hardware, software executed by a processor, firmware, or any combination thereof. If implemented in software executed by a processor, the functions of the base station beamsweep manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station beamsweep manager 1015 and/or at least some of its various sub-components may be physically located at various positions, including being distributed such that portions of functions are implemented at different physical locations by one or more physical devices. In some examples, base station beamsweep manager 1015 and/or at least some of its various sub-components may be a separate and distinct component in accordance with various aspects of the present disclosure. In other examples, base station beamsweep manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beamsweep manager 1015 may transmit a resource grant for an uplink transmission from a UE 115 in communication with the serving base station, the uplink transmission corresponding to one of a set of receive beam directions of a beamsweeping operation performed by the serving base station and receive a communication from the UE 115 during the beamsweeping operation and in accordance with the resource grant.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
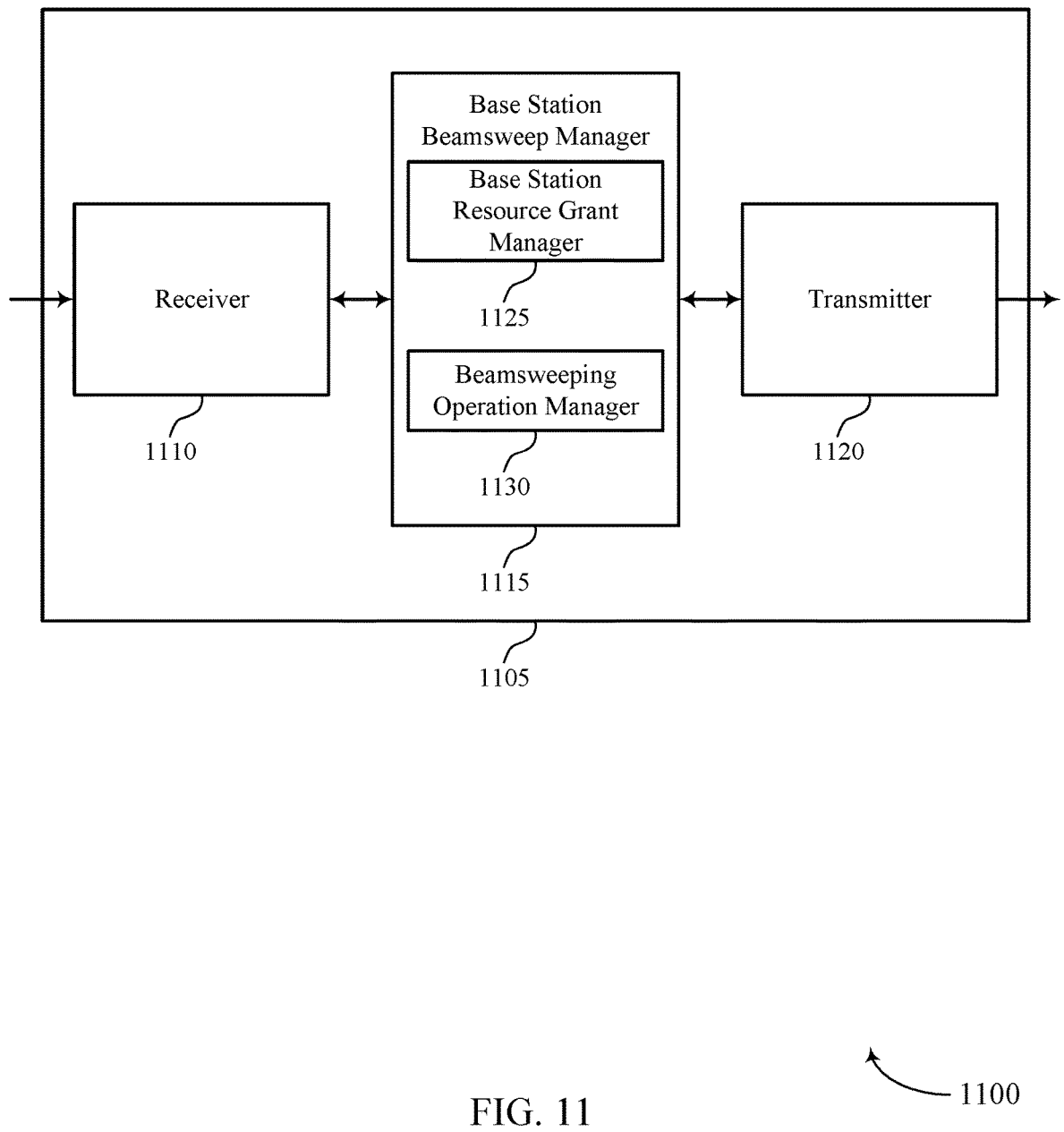

FIG. 11 shows a block diagram 1100 of a wireless device 1105 that supports data transmissions during base station beamsweeping operations in accordance with various aspects of the present disclosure. Wireless device 1105 may be an example of aspects of a wireless device 1005 or a base station 105 as described with reference to FIGS. 1, 2, and 10. Wireless device 1105 may include receiver 1110, base station beamsweep manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to data transmissions during base station beamsweep, etc.). Information may be passed on to other components of the device. The receiver 1110 may be an example of aspects of the transceiver 1335 described with reference to FIG. 13.

Base station beamsweep manager 1115 may be an example of aspects of the base station beamsweep manager 1315 described with reference to FIG. 13. Base station beamsweep manager 1115 may also include base station resource grant manager 1125 and beamsweeping operation manager 1130.

Base station resource grant manager 1125 may include in the resource grant one or more resources corresponding to the one or more receive beams and transmit a resource grant for an uplink transmission from a UE 115 in communication with the base station 105, the uplink transmission corresponding to one of a set of receive beam directions of a beamsweeping operation performed by the base station 105. In some cases, base station resource grant manager 1125 may transmit, as part of the resource grant, an indication of a periodicity by which the base station 105 changes its receive beam. In some cases, base station resource grant manager 1125 may transmit, as part of the resource grant, an indication of a periodicity by which the base station 105 changes its receive beam. Additionally or alternatively, base station resource grant manager 1125 may transmit, as part of the resource grant, an indication of bandwidth to be used for the communication, a duration for which the resource grant is valid, an RS pattern to be used by the UE 115, or combinations thereof.

Beamsweeping operation manager 1130 may receive a communication from the UE 115 during the beamsweeping operation and in accordance with the resource grant. In some cases, beamsweeping operation manager 1130 may receive the communication with one or more uplink RSs based on the RS pattern. Additionally or alternatively, beamsweeping operation manager 1130 may receive an RS for each OFDM symbol (or each set of OFDM symbols) during which the communication is received. In some examples, beamsweeping operation manager 1130 may receive the communication with an RS corresponding to each change in the serving base station 105 receive beam. Beamsweeping operation manager 1130 may, in some examples, receive the communication during a time frame in which the base station receive beam is in a fixed beam pattern. In some examples, beamsweeping operation manager 1130 may receive the communication from the UE 115 in accordance with the reduced transmission rank. In some cases, receiving the communication from the UE 115 during the beamsweeping operation includes receiving the communication over multiple OFDM symbols during the beamsweeping operation. In some cases, receiving the communication from the UE 115 during the beamsweeping operation includes receiving the communication during a single OFDM symbol during the beamsweeping operation. In some cases, beamsweeping operation manager 1130 may transmit an indication of a periodicity by which the serving base station 105 changes its receive beam, where the indication may be transmitted as part of an RRC message (e.g., an RRC control message), an MIB, an SIB, an mSIB, RMSI, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
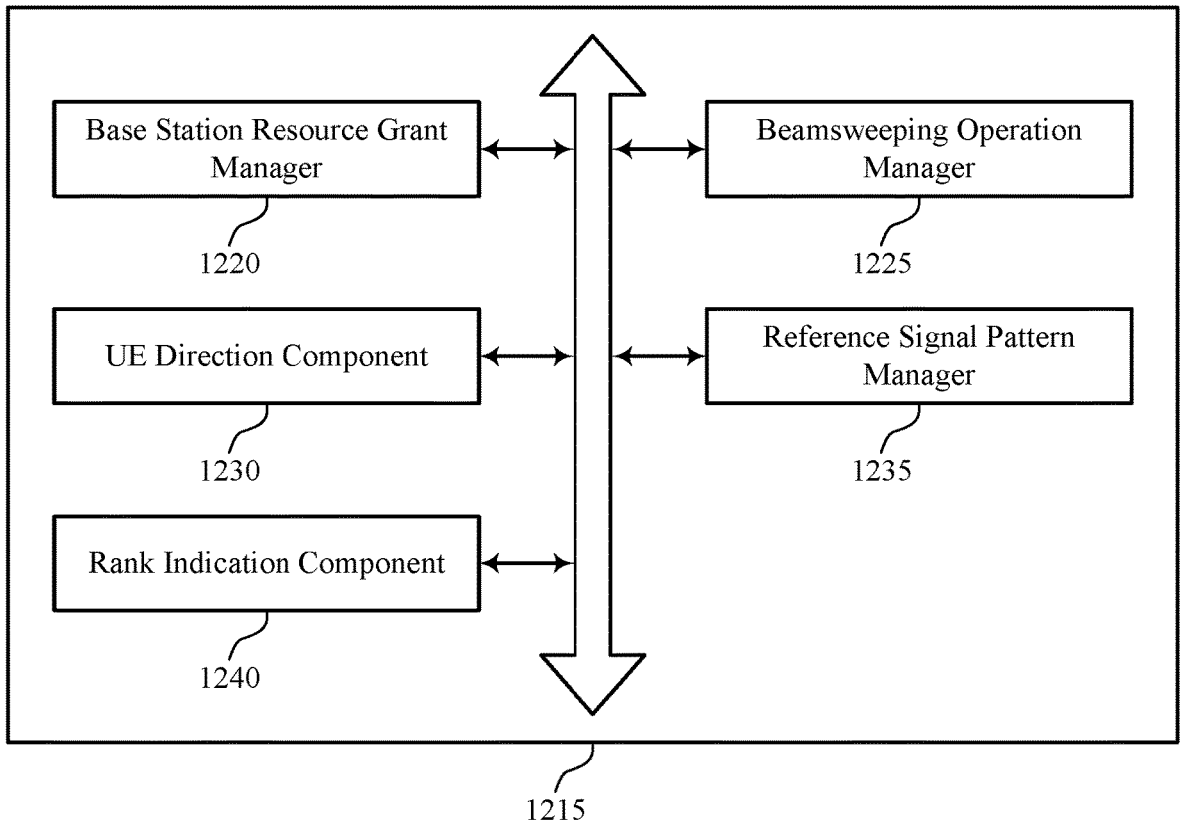

FIG. 12 shows a block diagram 1200 of a base station beamsweep manager 1215 that supports data transmissions during base station beamsweeping operations in accordance with various aspects of the present disclosure. The base station beamsweep manager 1215 may be an example of aspects of a base station beamsweep manager 1315 described with reference to FIGS. 10, 11, and 13. The base station beamsweep manager 1215 may include base station resource grant manager 1220, beamsweeping operation manager 1225, UE direction component 1230, reference signal pattern manager 1235, and rank indication component 1240. Each of these modules may communicate, directly or indirectly, with one another (e.g., via one or more buses).

Base station resource grant manager 1220 may include in the resource grant one or more resources corresponding to the one or more receive beams, transmit a resource grant for an uplink transmission from a UE 115 in communication with the serving base station 105, the uplink transmission corresponding to one of a set of receive beam directions of a beamsweeping operation performed by the serving base station 105, and transmit, as part of the resource grant, an indication of a periodicity by which the serving base station 105 changes its receive beam. In some cases, base station resource grant manager 1220 may transmit, as part of the resource grant, an indication of a periodicity by which the serving base station 105 changes its receive beam. Additionally or alternatively, base station resource grant manager 1220 may transmit, as part of the resource grant, an indication of bandwidth to be used for the communication, a duration for which the resource grant is valid, an RS pattern to be used by the UE 115, or combinations thereof. In some cases, beamsweeping operation manager 1225 may transmit the indication of a periodicity by which the serving base station 105 changes its receive beam, where the indication may be transmitted as part of an RRC message (e.g., an RRC control message), an MIB, an SIB, an mSIB, RMSI, or a combination thereof.

Beamsweeping operation manager 1225 may receive a communication from the UE 115 during the beamsweeping operation and in accordance with the resource grant. In some cases, beamsweeping operation manager 1225 may receive the communication with one or more uplink RSs based on the RS pattern. Additionally or alternatively, beamsweeping operation manager 1225 may receive an RS for each OFDM symbol during which the communication is received. In some examples, beamsweeping operation manager 1225 may receive the communication with an RS corresponding to each change in the serving base station 105 receive beam. Beamsweeping operation manager 1225 may, in some examples, receive the communication during a time frame in which the base station receive beam is in a fixed beam pattern. In some examples, beamsweeping operation manager 1225 may receive the communication from the UE 115 in accordance with the reduced transmission rank. In some cases, receiving the communication from the UE 115 during the beamsweeping operation includes receiving the communication over multiple OFDM symbols during the beamsweeping operation. In some cases, receiving the communication from the UE 115 during the beamsweeping operation includes receiving the communication during a single OFDM symbol during the beamsweeping operation.

UE direction component 1230 may determine that the UE 115 is in a direction of one or more receive beams of the beamsweeping operation. Reference signal pattern manager 1235 may indicate a RS pattern to the UE 115, wherein the communication is partitioned by the UE 115 into multiple transmissions such that a duration of each of the multiple transmissions is based at least in part on the RS pattern. In some cases, the RS pattern corresponds to a receive beam pattern used by the serving base station 105 to receive RACH transmissions or SR transmissions. In some cases, the receive beam pattern includes a single receive beam to receive RACH transmissions, SR transmissions, or BFRQ transmissions associated with multiple consecutive downlink synchronization beams. Rank indication component 1240 may indicate that the UE 115 is to use a reduced transmission rank in accordance with a predetermined pattern corresponding to a RACH slot schedule.

Figure 13:
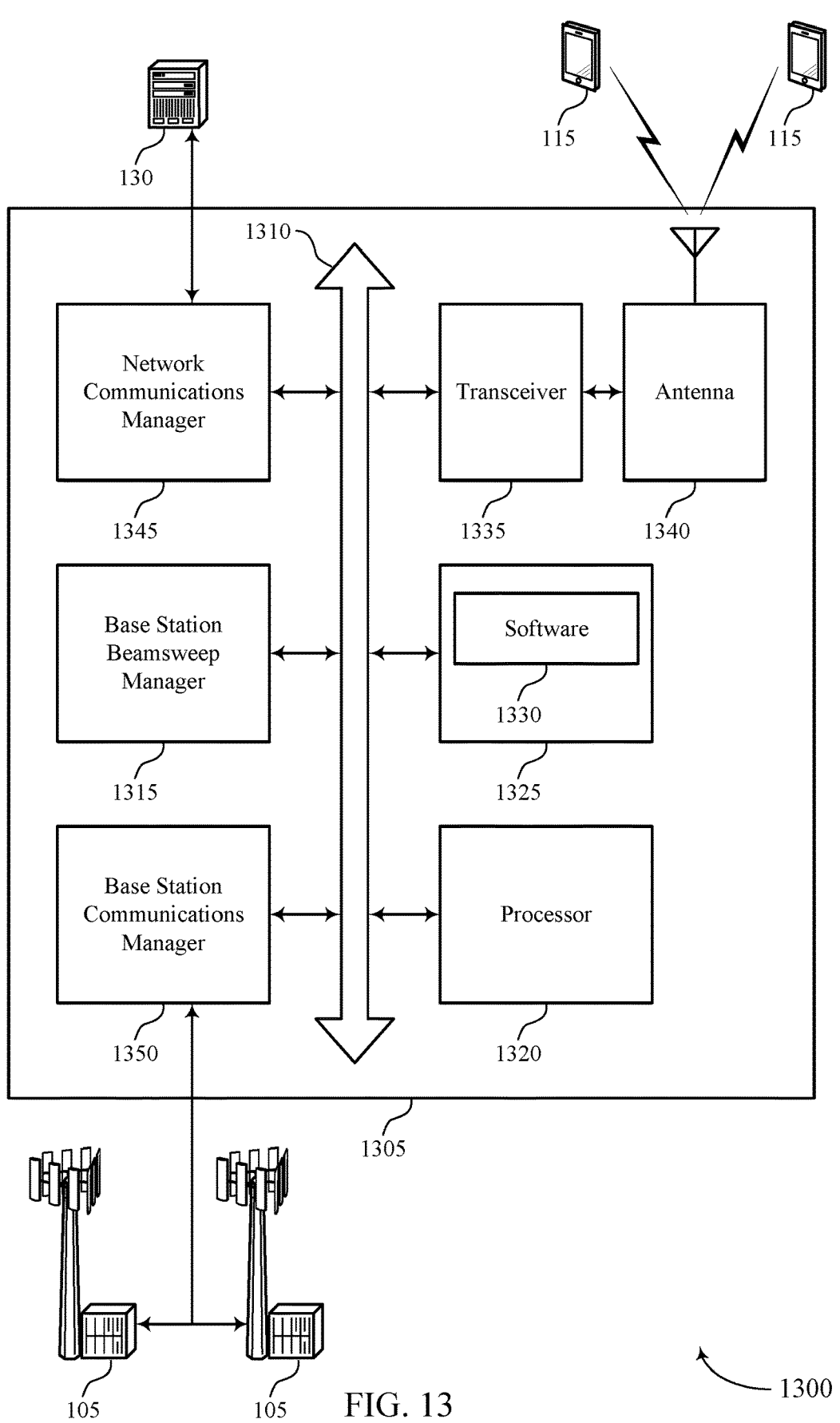
FIG. 13 illustrates a block diagram of a system including a base station that supports data transmissions during base station beamsweeping operations in accordance with aspects of the present disclosure.

FIG. 13 shows a diagram of a system 1300 including a device 1305 that supports data transmissions during base station beamsweeping operations in accordance with various aspects of the present disclosure. Device 1305 may be an example of or include the components of a base station 105 as described above, e.g., with reference to FIGS. 1 and 2. Device 1305 may include components for bi-directional voice and data communications including components for transmitting and receiving communications, including base station beamsweep manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting data transmissions during base station beamsweep).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support data transmissions during base station beamsweeping operations. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the device 1305 may include a single antenna 1340. However, in some cases the device 1305 may have more than one antenna 1340, which may be capable of concurrently transmitting or receiving multiple wireless transmissions. Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base stations 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
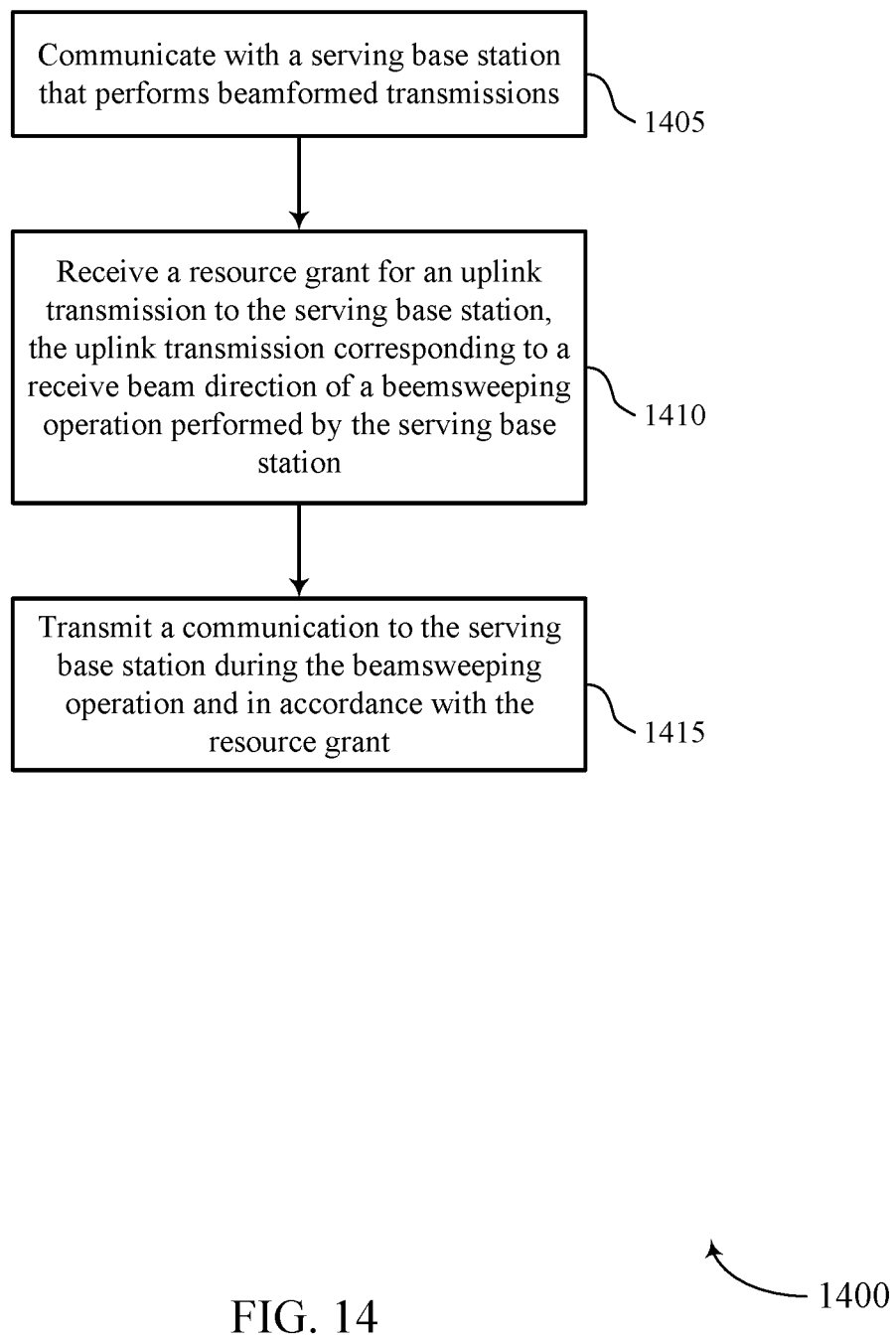
FIGS. 14 through 19 illustrate methods for data transmissions during base station beamsweeping operations in accordance with aspects of the present disclosure.

FIG. 14 shows a flowchart illustrating a method 1400 for data transmissions during base station beamsweeping operations in accordance with various aspects of the present disclosure. The operations of method 1400 may be implemented by a UE 115 or its components as described herein. For example, the operations of method 1400 may be performed by a UE beamsweep manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may communicate with a serving base station 105 that performs beamformed transmissions. The operations of 1405 may be performed according to the methods described with reference to FIGS. 1 through 5. In certain examples, aspects of the operations of 1405 may be performed by a beamformed transmission component as described with reference to FIGS. 6 through 9.

At 1410 the UE 115 may receive a resource grant for an uplink transmission to the serving base station 105, the uplink transmission corresponding to a receive beam direction of a beamsweeping operation performed by the serving base station 105. The operations of 1410 may be performed according to the methods described with reference to FIGS. 1 through 5. In certain examples, aspects of the operations of 1410 may be performed by a resource grant manager as described with reference to FIGS. 6 through 9.

At 1415 the UE 115 may transmit a communication to the serving base station 105 during the beamsweeping operation and in accordance with the resource grant. The operations of 1415 may be performed according to the methods described with reference to FIGS. 1 through 5. In certain examples, aspects of the operations of 1415 may be performed by a communication manager as described with reference to FIGS. 6 through 9.

Figure 15:
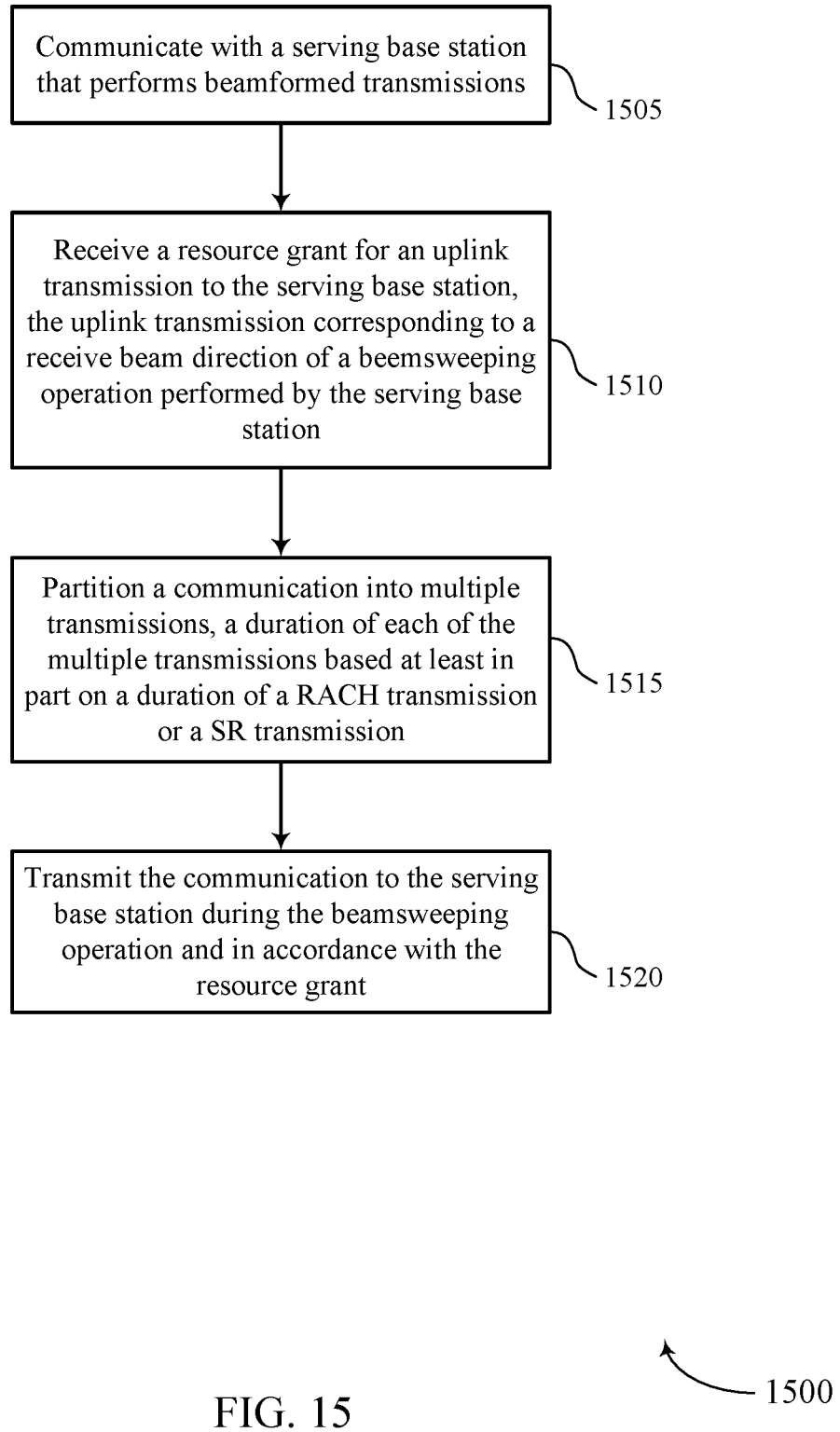

FIG. 15 shows a flowchart illustrating a method 1500 for data transmissions during base station beamsweeping operations in accordance with various aspects of the present disclosure. The operations of method 1500 may be implemented by a UE 115 or its components as described herein. For example, the operations of method 1500 may be performed by a UE beamsweep manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may communicate with a serving base station 105 that performs beamformed transmissions. The operations of 1505 may be performed according to the methods described with reference to FIGS. 1 through 5. In certain examples, aspects of the operations of 1505 may be performed by a beamformed transmission component as described with reference to FIGS. 6 through 9.

At 1510 the UE 115 may receive a resource grant for an uplink transmission to the serving base station 105, the uplink transmission corresponding to a receive beam direction of a beamsweeping operation performed by the serving base station 105. The operations of 1510 may be performed according to the methods described with reference to FIGS. 1 through 5. In certain examples, aspects of the operations of 1510 may be performed by a resource grant manager as described with reference to FIGS. 6 through 9.

At 1515 the UE 115 may partition a communication into multiple transmissions, a duration of each of the multiple transmissions based at least in part on a duration of a RACH transmission or a SR transmission that the UE 115 is configured to transmit during the beamsweeping operation. The operations of 1515 may be performed according to the methods described with reference to FIGS. 1 through 5. In certain examples, aspects of the operations of 1515 may be performed by a partition component as described with reference to FIGS. 6 through 9.

At 1520 the UE 115 may transmit the communication to the serving base station 105 during the beamsweeping operation and in accordance with the resource grant. The operations of 1520 may be performed according to the methods described with reference to FIGS. 1 through 5. In certain examples, aspects of the operations of 1520 may be performed by a communication manager as described with reference to FIGS. 6 through 9.

Figure 16:
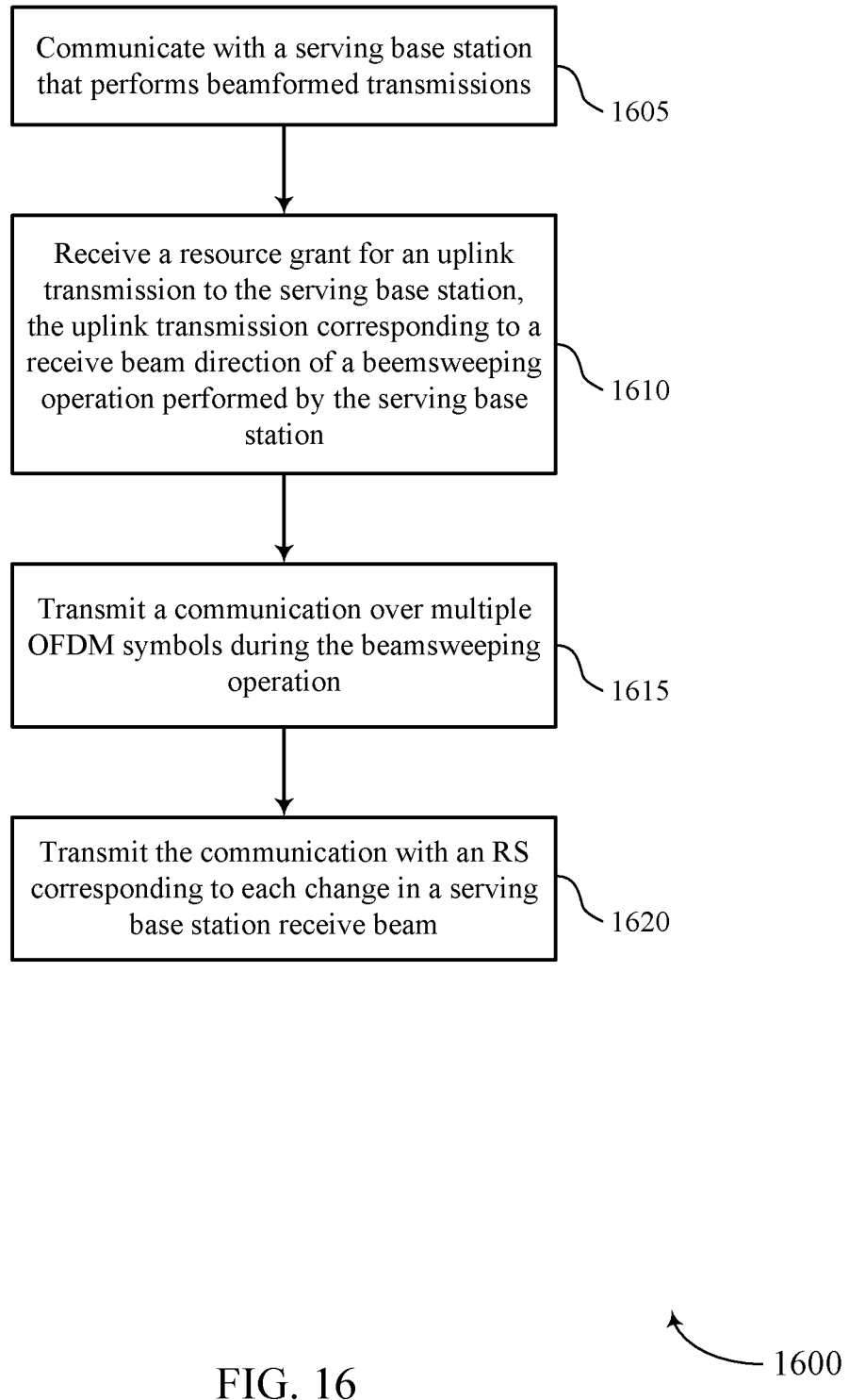

FIG. 16 shows a flowchart illustrating a method 1600 for data transmissions during base station beamsweeping operations in accordance with various aspects of the present disclosure. The operations of method 1600 may be implemented by a UE 115 or its components as described herein. For example, the operations of method 1600 may be performed by a UE beamsweep manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may communicate with a serving base station 105 that performs beamformed transmissions. The operations of 1605 may be performed according to the methods described with reference to FIGS. 1 through 5. In certain examples, aspects of the operations of 1605 may be performed by a beamformed transmission component as described with reference to FIGS. 6 through 9.

At 1610 the UE 115 may receive a resource grant for an uplink transmission to the serving base station 105, the uplink transmission corresponding to a receive beam direction of a beamsweeping operation performed by the serving base station 105. The operations of 1610 may be performed according to the methods described with reference to FIGS. 1 through 5. In certain examples, aspects of the operations of 1610 may be performed by a resource grant manager as described with reference to FIGS. 6 through 9.

At 1615 the UE 115 may transmit a communication over multiple OFDM symbols during the beamsweeping operation. The operations of 1615 may be performed according to the methods described with reference to FIGS. 1 through 5.

In certain examples, aspects of the operations of 1615 may be performed by a communication manager as described with reference to FIGS. 6 through 9.

At 1620 the UE 115 may transmit the communication with an RS corresponding to each change in a serving base station receive beam. The operations of 1620 may be performed according to the methods described with reference to FIGS. 1 through 5. In certain examples, aspects of the operations of 1620 may be performed by a reference signal component as described with reference to FIGS. 6 through 9.

Figure 17:
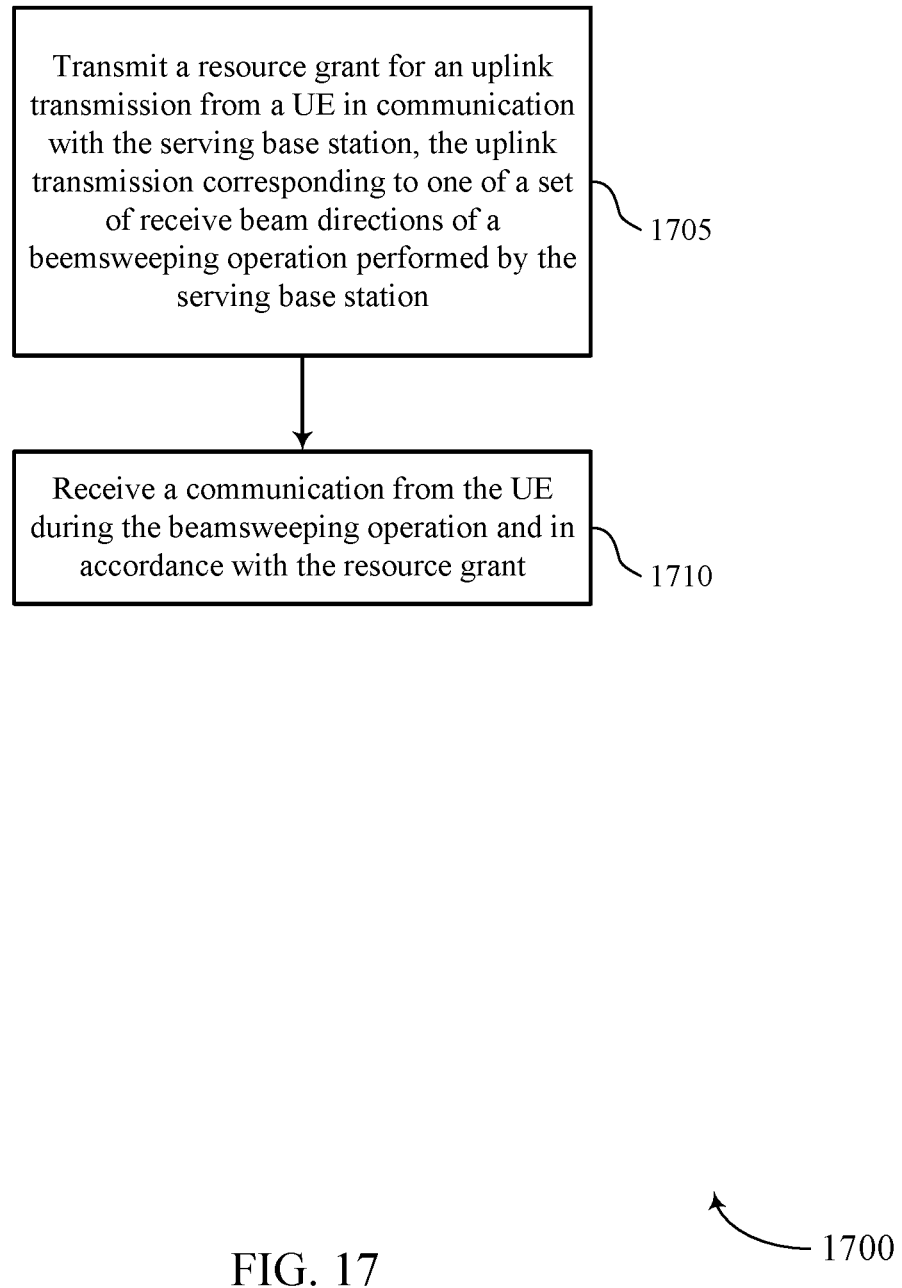

FIG. 17 shows a flowchart illustrating a method 1700 for data transmissions during base station beamsweeping operations in accordance with various aspects of the present disclosure. The operations of method 1700 may be implemented by a base station 105 or its components as described herein. For example, the operations of method 1700 may be performed by a base station beamsweep manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a resource grant for an uplink transmission from a UE 115 in communication with the base station 105, the uplink transmission corresponding to one of a set of receive beam directions of a beamsweeping operation performed by the base station 105. The operations of 1705 may be performed according to the methods described with reference to FIGS. 1 through 5. In certain examples, aspects of the operations of 1705 may be performed by a base station resource grant manager as described with reference to FIGS. 10 through 13.

At 1710 the base station 105 may receive a communication from the UE 115 during the beamsweeping operation and in accordance with the resource grant. The operations of 1710 may be performed according to the methods described with reference to FIGS. 1 through 5. In certain examples, aspects of the operations of 1710 may be performed by a beamsweeping operation manager as described with reference to FIGS. 10 through 13.

Figure 18:
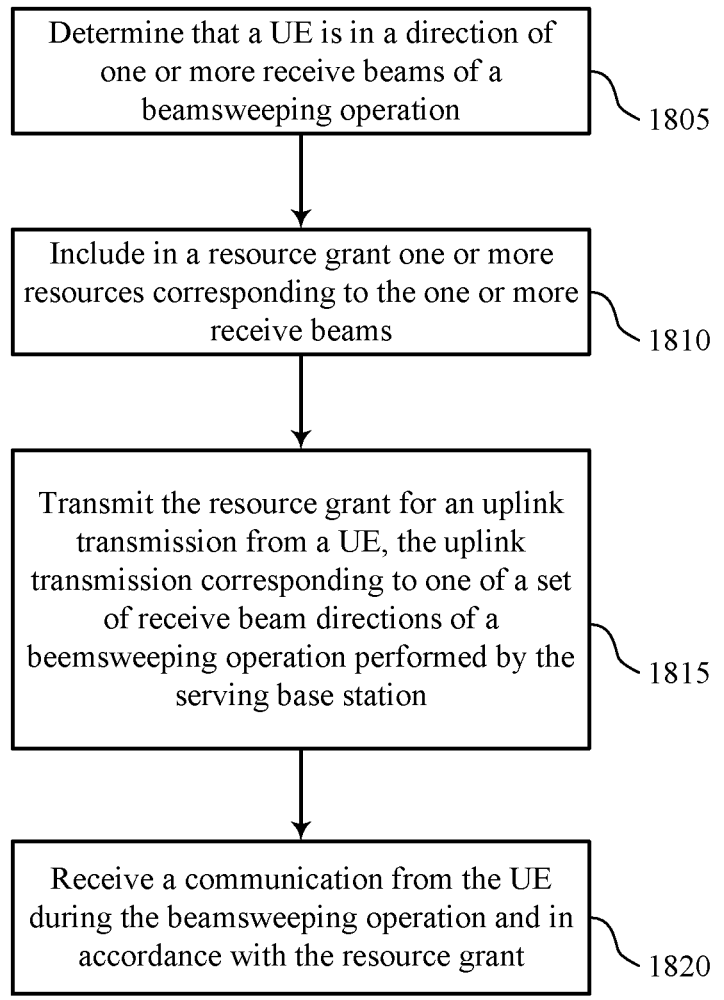

FIG. 18 shows a flowchart illustrating a method 1800 for data transmissions during base station beamsweeping operations in accordance with various aspects of the present disclosure. The operations of method 1800 may be implemented by a base station 105 or its components as described herein. For example, the operations of method 1800 may be performed by a base station beamsweep manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may determine that a UE 115 is in a direction of one or more receive beams of a beamsweeping operation. The operations of 1805 may be performed according to the methods described with reference to FIGS. 1 through 5. In certain examples, aspects of the operations of 1805 may be performed by a UE direction component as described with reference to FIGS. 10 through 13.

At 1810 the base station 105 may include in a resource grant one or more resources corresponding to the one or more receive beams. The operations of 1810 may be performed according to the methods described with reference to FIGS. 1 through 5. In certain examples, aspects of the operations of 1810 may be performed by a base station resource grant manager as described with reference to FIGS. 10 through 13.

At 1815 the base station 105 may transmit the resource grant for an uplink transmission from a UE 115 in communication with the base station 105, the uplink transmission corresponding to one of a set of receive beam directions of a beamsweeping operation performed by the base station 105. The operations of 1815 may be performed according to the methods described with reference to FIGS. 1 through 5. In certain examples, aspects of the operations of 1815 may be performed by a base station resource grant manager as described with reference to FIGS. 10 through 13.

At 1820 the base station 105 may receive a communication from the UE 115 during the beamsweeping operation and in accordance with the resource grant. The operations of 1820 may be performed according to the methods described with reference to FIGS. 1 through 5. In certain examples, aspects of the operations of 1820 may be performed by a beamsweeping operation manager as described with reference to FIGS. 10 through 13.

Figure 19:
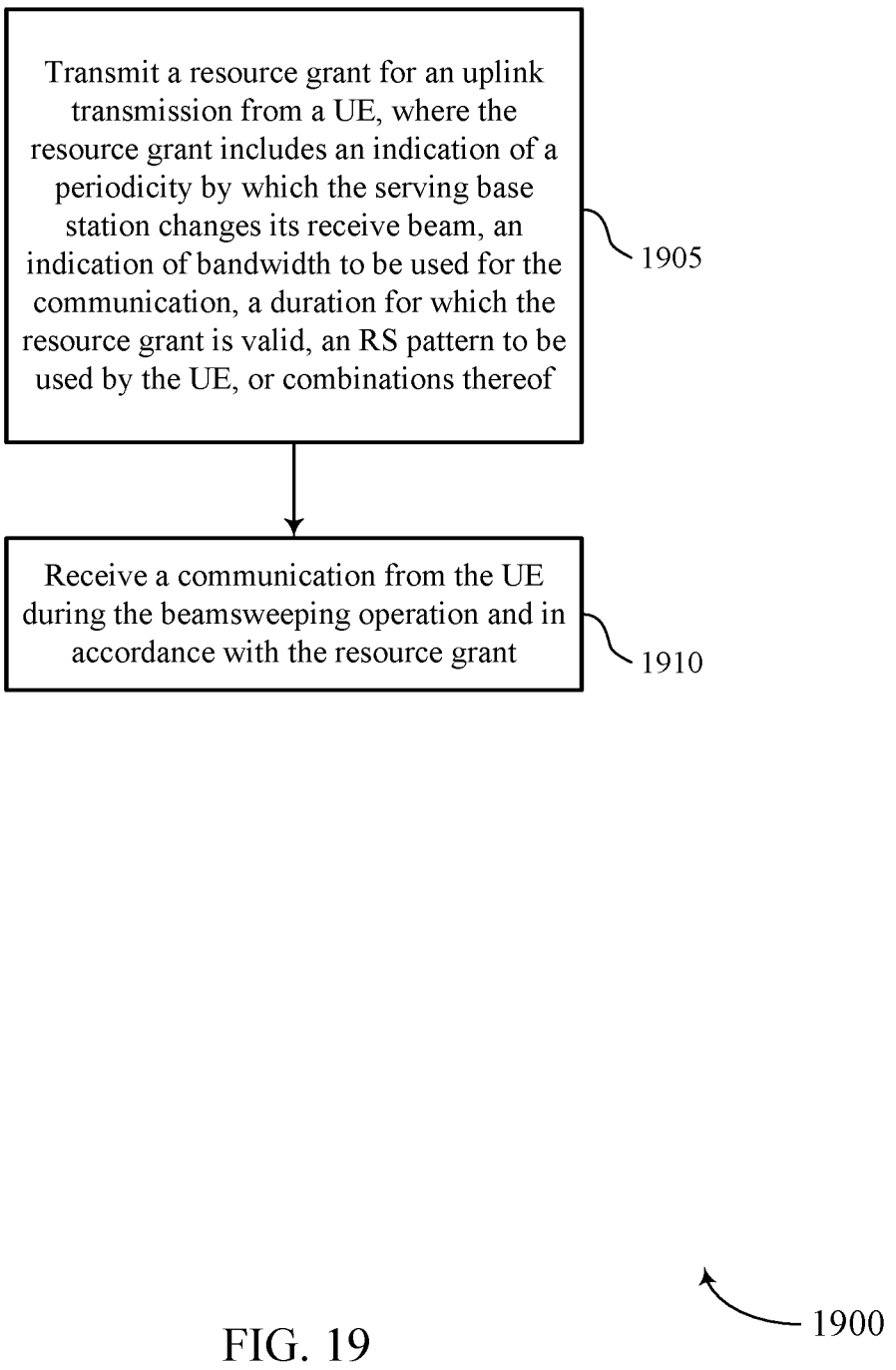

FIG. 19 shows a flowchart illustrating a method 1900 for data transmissions during base station beamsweeping operations in accordance with various aspects of the present disclosure. The operations of method 1900 may be implemented by a base station 105 or its components as described herein. For example, the operations of method 1900 may be performed by a base station beamsweep manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may transmit a resource grant for an uplink transmission from a UE 115 in communication with the base station 105, where the resource grant includes an indication of a periodicity by which the base station 105 changes its receive beam, an indication of bandwidth to be used for the communication, a duration for which the resource grant is valid, an RS pattern to be used by the UE 115, or combinations thereof. In some examples, the uplink transmission corresponds to one of a set of receive beam directions of a beamsweeping operation performed by the base station 105. The operations of 1905 may be performed according to the methods described with reference to FIGS. 1 through 5. In certain examples, aspects of the operations of 1905 may be performed by a base station resource grant manager as described with reference to FIGS. 10 through 13.

At 1910 the base station 105 may receive a communication from the UE 115 during the beamsweeping operation and in accordance with the resource grant. The operations of 1910 may be performed according to the methods described with reference to FIGS. 1 through 5. In certain examples, aspects of the operations of 1910 may be performed by a beamsweeping operation manager as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   communicating with a serving base station that performs beamformed transmissions;
   receiving a resource grant for an uplink transmission to the serving base station, the uplink transmission corresponding to a receive beam direction of a beam-sweeping operation performed by the serving base station, wherein the resource grant indicates a reference signal (RS) pattern to be used by the UE when transmitting to the serving base station;
   determining that the RS pattern corresponds to a receive beam pattern of receive beams used by the serving base station in association with the beamsweeping operation to receive random access channel (RACH) transmissions, scheduling request (SR) transmissions, or beam failure recovery request (BFRQ) transmissions; and
   transmitting, based at least in part on the RS pattern, a communication to the serving base station during the beamsweeping operation and in accordance with the resource grant, wherein transmitting the communication to the serving base station during the beamsweeping operation comprises:
      partitioning the communication into multiple transmissions, wherein a duration of each of the multiple transmissions is based at least in part on the RS pattern indicated by the serving base station; and
      transmitting the communication with one or more uplink RSs based at least in part on the RS pattern, wherein the one or more uplink RSs correspond to each change in a receive beam of the serving base station in accordance with the RS pattern and the beamsweeping operation.

2. The method of claim 1, wherein receiving the resource grant for the uplink transmission comprises:
   receiving, as part of the resource grant, an indication of a periodicity by which the serving base station changes its receive beam.

3. The method of claim 1, further comprising:
   receiving an indication of a periodicity by which the serving base station changes its receive beam, the indication received as part of a radio resource control (RRC) message, a master information block (MIB), a system information block (SIB), a minimum SIB (mSIB), remaining minimum system information (RMSI), or a combination thereof.

4. The method of claim 1, wherein receiving the resource grant for the uplink transmission comprises:
   receiving, as part of the resource grant, an indication of bandwidth to be used for the communication, a duration for which the resource grant is valid, or a combination thereof.

5. The method of claim 1, wherein the duration of each of the multiple transmissions is further based at least in part on a duration of a RACH transmission, an SR transmission, or a BFRQ transmission able to be sent by the UE during the beamsweeping operation.

6. The method of claim 1, wherein the receive beam pattern includes a single receive beam to receive the RACH transmissions or the SR transmissions, wherein the single receive beam is associated with multiple consecutive downlink synchronization beams.

7. The method of claim 1, wherein transmitting the communication to the serving base station during the beamsweeping operation comprises:
transmitting the communication over multiple orthogonal frequency-division multiplexing (OFDM) symbols during the beamsweeping operation.

8. The method of claim 7, further comprising:
transmitting the one or more uplink RSs for one or more OFDM symbols during which the communication is transmitted.

9. The method of claim 7, further comprising:
updating a UE transmit beam used for transmitting the communication at a same periodicity that the serving base station changes its receive beam.

10. The method of claim 9, wherein updating the UE transmit beam is based at least in part on a previous beam training of UE transmit beams corresponding to receive beams of the serving base station.

11. The method of claim 9, wherein updating the UE transmit beam is based at least in part on reciprocity between the UE transmit beam and a UE receive beam optimized for an associated downlink synchronization beam of the serving base station.

12. The method of claim 1, further comprising:
transmitting a RACH transmission to a second base station while transmitting the communication to the serving base station.

13. The method of claim 12, further comprising:
reducing a transmission rank of the communication during the RACH transmission.

14. The method of claim 13, wherein reducing the transmission rank of the communication is based on a predetermined pattern corresponding to RACH slots.

15. A method for wireless communication at a serving base station, comprising:
transmitting a resource grant for an uplink transmission from a user equipment (UE) in communication with the serving base station, wherein the resource grant indicates a reference signal (RS) pattern to be used by the UE when transmitting to the serving base station, the RS pattern corresponding to a receive beam pattern of receive beams used by the serving base station in association with a beamsweeping operation to receive random access channel (RACH) transmissions, scheduling request (SR) transmissions, or beam failure recovery request (BFRQ) transmissions, the uplink transmission corresponding to one of a set of receive beam directions of the beamsweeping operation performed by the serving base station; and
receiving, based at least in part on the RS pattern, a communication from the UE during the beamsweeping operation and in accordance with the resource grant, wherein the communication is partitioned by the UE into multiple transmissions such that a duration of each of the multiple transmissions is based at least in part on the RS pattern, wherein receiving the communication from the UE during the beamsweeping operation comprises:
receiving the communication with one or more uplink RSs based at least in part on the RS pattern, wherein the one or more uplink RSs correspond to each change in a receive beam of the serving base station in accordance with the RS pattern and the beamsweeping operation.

16. The method of claim 15, further comprising:
determining that the UE is in a direction of one or more receive beams of the beamsweeping operation; and
including, in the resource grant, one or more resources corresponding to the one or more receive beams.

17. The method of claim 15, wherein transmitting the resource grant for the uplink transmission comprises:
transmitting, as part of the resource grant, an indication of a periodicity by which the serving base station changes its receive beam.

18. The method of claim 15, further comprising:
transmitting an indication of a periodicity by which the serving base station changes its receive beam, the indication transmitted as part of a radio resource control (RRC) message, a master information block (MIB), a system information block (SIB), a minimum SIB (mSIB), remaining minimum system information (RMSI), or a combination thereof.

19. The method of claim 15, wherein transmitting the resource grant for the uplink transmission comprises:
transmitting, as part of the resource grant, an indication of bandwidth to be used for the communication, a duration for which the resource grant is valid, or a combination thereof.

20. The method of claim 15, wherein the receive beam pattern includes a single receive beam to receive the RACH transmissions or the SR transmissions, wherein the single receive beam is associated with multiple consecutive downlink synchronization beams.

21. The method of claim 15, wherein receiving the communication from the UE during the beamsweeping operation comprises:
receiving the communication over multiple orthogonal frequency-division multiplexing (OFDM) symbols during the beamsweeping operation.

22. The method of claim 15, further comprising:
indicating that the UE is to use a reduced transmission rank in accordance with a predetermined pattern corresponding to a RACH slot schedule; and
receiving the communication from the UE in accordance with the reduced transmission rank.

23. An apparatus for wireless communication, in a system comprising:
a processor;
memory in electronic communication with the processor; and
instructions stored in the memory and operable, when executed by the processor, to cause the apparatus to:
communicate with a serving base station that performs beamformed transmissions;
receive a resource grant for an uplink transmission to the serving base station, the uplink transmission corresponding to a receive beam direction of a beamsweeping operation performed by the serving base station, wherein the resource grant indicates a reference signal (RS) pattern to be used by the apparatus when transmitting to the serving base station;

determine that the RS pattern corresponds to a receive beam pattern of receive beams used by the serving base station in association with the beamsweeping operation to receive random access channel (RACH) transmissions, scheduling request (SR) transmissions, or beam failure recovery request (BFRQ) transmissions; and transmit, based at least in part on the RS pattern, a communication to the serving base station during the beamsweeping operation and in accordance with the resource grant, wherein the instructions to transmit the communication to the serving base station during the beamsweeping operation further cause the apparatus to:

partition the communication into multiple transmissions, wherein a duration of each of the multiple transmissions is based at least in part on the RS pattern indicated by the serving base station; and transmit the communication with one or more uplink RSs based at least in part on the RS pattern, wherein the one or more uplink RSs correspond to each change in a receive beam of the serving base station in accordance with the RS pattern and the beamsweeping operation.

24. The apparatus of claim 23, wherein the instructions executable to cause the apparatus to receive the resource grant for the uplink transmission comprise instructions further executable to cause the apparatus to:

receive, as part of the resource grant, an indication of bandwidth to be used for the communication, a duration for which the resource grant is valid, or a combination thereof.

25. The apparatus of claim 23, wherein the instructions executable to cause the apparatus to transmit the communication to the serving base station during the beamsweeping operation comprise instructions further executable to cause the apparatus to:

transmit the communication over multiple orthogonal frequency-division multiplexing (OFDM) symbols during the beamsweeping operation.

26. The apparatus of claim 25, wherein the instructions are further executable to cause the apparatus to:

transmit the one or more uplink RSs for one or more OFDM symbols during which the communication is transmitted.

27. The apparatus of claim 23, wherein the instructions executable to cause the apparatus to receive the resource grant for the uplink transmission comprise instructions further executable to cause the apparatus to:

receive, as part of the resource grant, an indication of a periodicity by which the serving base station changes its receive beam.

28. The apparatus of claim 23, wherein the instructions are further executable to cause the apparatus to:

receive an indication of a periodicity by which the serving base station changes its receive beam, the indication received as part of a radio resource control (RRC) message, a master information block (MIB), a system information block (SIB), a minimum SIB (mSIB), remaining minimum system information (RMSI), or a combination thereof.

29. The apparatus of claim 23 wherein the duration of each of the multiple transmissions is further based at least in part on a duration of a RACH transmission, an SR transmission, or a BFRQ transmission able to be sent by the UE during the beamsweeping operation.

30. An apparatus for wireless communication, in a system comprising:

a processor;
memory in electronic communication with the processor; and
instructions stored in the memory and operable, when executed by the processor, to cause the apparatus to:

transmit a resource grant for an uplink transmission from a user equipment (UE) in communication with the apparatus, wherein the resource grant indicates a reference signal (RS) pattern to be used by the UE when transmitting to the apparatus, wherein the RS pattern corresponds to a receive beam pattern of receive beams used by the apparatus in association with a beamsweeping operation to receive random access channel (RACH) transmissions, scheduling request (SR) transmissions, or beam failure recovery request (BFRQ) transmissions, the uplink transmission corresponding to one of a set of receive beam directions of the beamsweeping operation performed by the apparatus; and receive, based at least in part on the RS pattern, a communication from the UE during the beamsweeping operation and in accordance with the resource grant, wherein the communications is partitioned by the UE into multiple transmissions such that a duration of each of the multiple transmissions is based at least in part on the RS pattern, wherein the instructions to receive the communication from the UE during the beamsweeping operation further cause the apparatus to:

receive the communication with one or more uplink RSs based at least in part on the RS pattern, wherein the one or more uplink RSs correspond to each change in a receive beam of the apparatus in accordance with the RS pattern and the beamsweeping operation.

* * * * *